US006639644B1

(12) United States Patent
Tateno et al.

(10) Patent No.: US 6,639,644 B1
(45) Date of Patent: Oct. 28, 2003

(54) LIQUID CRYSTAL DISPLAY AND MANUFACTURE THEREOF WITH ELECTROSTATIC CONTROL OF SPRAYED SPACER PARTICLE DEPOSITION

(75) Inventors: Akihiko Tateno, Kyoto (JP); Hiroyuki Nakatani, Kyoto (JP); Kazuya Yoshimura, Osaka (JP); Makoto Nakahara, Osaka (JP); Takatoshi Kira, Osaka (JP); Daisuke Ikesugi, Osaka (JP); Masaki Ban, Saitama (JP); Hiroshi Murata, Tokyo (JP); Masaaki Kubo, Tokyo (JP)

(73) Assignees: Sekisui Chemical Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/623,376

(22) PCT Filed: Mar. 3, 1999

(86) PCT No.: PCT/JP99/01020

§ 371 (c)(1),
(2), (4) Date: Oct. 18, 2000

(87) PCT Pub. No.: WO99/45428

PCT Pub. Date: Sep. 10, 1999

(30) Foreign Application Priority Data

| | | |
|---|---|---|
| Mar. 3, 1998 | (JP) | 10/50749 |
| May 6, 1998 | (JP) | 10/123396 |
| May 6, 1998 | (JP) | 10/123397 |
| May 6, 1998 | (JP) | 10/123398 |
| Jun. 16, 1998 | (JP) | 10/168634 |
| Nov. 3, 1998 | (JP) | 10/59686 |
| Nov. 18, 1998 | (JP) | 10/327688 |

(51) Int. Cl.[7] .................... G02F 1/1339
(52) U.S. Cl. .................... 349/155; 349/187
(58) Field of Search .................... 349/155–157

(56) References Cited

U.S. PATENT DOCUMENTS 4,971,829 A * 11/1990 Komura et al. ............... 427/27

FOREIGN PATENT DOCUMENTS

| | | | |
|---|---|---|---|
| JP | 03-293328 | * 12/1991 | G02F/1/1339 |
| JP | 04-204417 | * 7/1992 | G02F/1/1339 |
| JP | 06-067184 | * 3/1994 | G02F/1/1339 |
| JP | 06-148654 | * 5/1994 | G02F/1/1339 |

* cited by examiner

*Primary Examiner*—Robert H. Kim
*Assistant Examiner*—Timothy Rude
(74) *Attorney, Agent, or Firm*—Connolly Bove Lodge & Hutz, LLP

(57) ABSTRACT

This invention has its object to provide a method of liquid display device production which enables spacer disposition in interelectrode spaces not having electrode, namely at black matrix sites, in STN type and TFT type liquid crystal display devices and further enables even spacer disposition to attain a uniform cell thickness all over the substrate to thereby produce liquid crystal display devices of high contrast and high display uniformity stably and in good yields, with a reduced spray step tact time, as well as liquid crystal display devices produced by such method.

This invention provides a method for producing a liquid crystal display device comprising spraying spacers onto at least one of a first substrate comprising at least pattern-forming transparent electrodes and a second substrate to be disposed opposingly above the first substrate and filling a liquid crystal into the space between both the substrates, and comprising, in spraying positively or negatively charged spacers onto the substrate, disposing the substrate in close contact with an earthed conductive stage having a volume resistance of not more than $10^{10}$ Ωcm and applying, to the transparent electrodes, a voltage of 200 V to 5 kV having the same polarity as the spacer charge polarity.

28 Claims, 25 Drawing Sheets

LIQUID CRYSTAL DISPLAY AND MANUFACTURE THEREOF WITH ELECTROSTATIC CONTROL OF SPRAYED SPACER PARTICLE DEPOSITION

TECHNICAL FIELD

The present invention relates to a method for producing a liquid crystal display device and to a liquid crystal display device.

BACKGROUND ART

Liquid crystal display devices are widely used in personal computers, portable electronic apparatus and the like. Generally, a liquid crystal display device comprises, as shown in FIG. 36, a liquid crystal layer 7 sandwiched between two substrates 1, on which color filters 4, a black matrix 5, transparent electrodes 3, an alignment layer 9 and so on are formed.

A TFT (thin film transistor) type liquid display device, as shown in FIG. 37, comprises a liquid crystal layer 7 sandwiched between a substrate 1*a*, which comprises a glass substrate 1 with transparent electrodes 3, color filters 4, a conductive black matrix 5, an overcoat layer 6, an alignment layer 9 and so on formed thereon, and a substrate 1*b*, which comprises a glass substrate 1 with transparent electrodes 3 each comprising a source electrode 14*a*, a drain electrode 14 and so on, insulating films 23, semiconductor films 16, gate electrodes 13, an alignment layer 9 and so on formed thereon.

In these liquid crystal display devices, it is spacers that regulate the distance between the two substrates and maintain the thickness of the liquid crystal layer at an appropriate level.

According to the prior art methods of liquid crystal display device production, spacers are sprayed and dispersed randomly but uniformly over the substrate on which pixel electrodes are formed. Therefore, as shown in FIG. 36 and FIG. 37, spacers are disposed also at the sites of some pixel electrodes, namely at some display sites of the liquid crystal display device. Spacers are generally made of a synthetic resin, glass or a like material and, when a spacer is disposed on a pixel electrode, its depolarizing action causes light leakage at the spacer site. Further, the liquid crystal alignment is disturbed on the spacer surface, causing a bright defect, hence the contrast and color tone are decreased and the display quality is deteriorated.

To solve such problems as mentioned above, spacers should be disposed only in spaces among neighboring electrodes, which are not display sites, namely only at sites covered by the black matrix, which is a light shield layer. The black matrix is provided for the purpose of improving the contrast of display of a liquid crystal display device or, in the case of a TFT type liquid crystal display device, for the purpose of preventing error operation of elements due to external light.

A technology of disposing spacers at sites corresponding to the black matrix, namely at sites other than display pixel sites, of a TFT type liquid crystal display device is disclosed in Japanese Kokai Publication Hei-04-256925 which comprises maintaining the gate electrode and drain electrode at the same electric potential in the step of spraying spacers. Further, Japanese Kokai Publication Hei-05-53121 discloses a method comprising applying a voltage to the circuit electrodes in the step of spacer spraying, while Japanese Kokai Publication Hei-05-61052 discloses a method comprising applying a positive voltage to the circuit electrodes and charging spacers negatively and spraying them by the dry method.

The inventions described in the references cited above use a substrate having thin film transistors (TFTs) formed thereon and control the spacer disposition by applying a voltage to the circuits of these thin film transistors.

However, they have a problem. Namely, application of a voltage to the substrate having thin film transistors (TFTS) formed thereon, for the purpose of controlling the spacer disposition may lead to destruction of elements by that voltage, hence to failure to function as a liquid crystal display device.

There is another problem. Namely, such technologies as mentioned above cannot be employed in STN type liquid display devices since the sites corresponding to the black matrix are spaces among transparent electrodes.

On the other hand, as a technology of disposing spacers in spaces between stripe-form transparent electrodes constituted by disposing a plurality of linear transparent electrodes in parallel on a substrate, as in STN type liquid crystal display devices, there is disclosed, in Japanese Kokai Publication Hei-04-204417, a method of producing liquid crystal display devices which comprises charging spacers either positively or negatively and applying a voltage of the same polarity to the linear transparent electrodes on the substrate in the step of spacer spraying.

This production method is intended to dispose spacers in interelectrode spaces by applying a voltage of the same polarity as the spacer charge polarity to the linear transparent electrodes to thereby cause spacer-electrode repulsion. However, mere application of a voltage of the same polarity as the spacer charge to the linear transparent electrodes cannot attain a sufficient reduction in electric potential between the transparent electrodes but leads to such a state as shown in FIG. 9. Thus, any electric field suited for spacer disposition is not formed, hence the precision of spacer disposition is very poor. It is therefore impossible to improve the contrast of the product liquid crystal display device to a satisfactory extent.

SUMMARY OF THE INVENTION

Accordingly, it is an object of the present invention to provide a method for producing a liquid display device by which the above problems are solved and which enables spacer disposition in interelectrode spaces where there is no electrode, namely at black matrix sites, in STN type and TFT type liquid crystal display devices and further enables even spacer disposition to attain a uniform cell thickness all over the substrate to thereby produce liquid crystal display devices of high contrast and high display uniformity stably and in good yields, with a reduced spray step tact time, as well as liquid crystal display devices produced by such method.

In a first aspect, the present invention provides a method for producing a liquid crystal display device comprising spraying spacers onto at least one of a first substrate comprising at least pattern-forming transparent electrodes and a second substrate to be disposed opposingly above the first substrate and filling a liquid crystal into the space between both the substrates, wherein, in spraying positively or negatively charged spacers onto the substrate, disposing the substrate in close contact with an earthed conductive stage having a volume resistance of not more than $10^{10}$ Ωcm, and a voltage of 200 V to 5 kV having the same polarity as the spacer charge polarity is applied to the transparent electrodes.

In a second aspect, the invention provides a method for producing a liquid crystal display device comprising spraying spacers onto at least one of a first substrate comprising at least pattern-forming transparent electrodes, a conductive black matrix and an overcoat layer and a second substrate to be disposed opposingly above the first substrate and filling a liquid crystal into the space between both the substrates, wherein, in spraying positively or negatively charged spacers onto the substrate, a voltage (V1) is applied to the conductive black matrix and a voltage (V2) to the transparent electrodes, both the voltages V1 and V2 being positive ones and satisfying the relation V1<V2 when the spacer charge polarity is positive, or both V1 and V2 being negative voltages and satisfying the relation V1>V2 when the spacer charge polarity is negative.

In a third aspect, the invention provides a method for producing a liquid crystal display device comprising spraying spacers onto at least one of a first substrate comprising at least pattern-forming transparent electrodes, an alignment layer and one or more display areas and a second substrate to be disposed opposingly above the first substrate and filling a liquid crystal into the space between both the substrates, wherein, in spraying positively or negatively charged spacers onto the substrate, the substrate is disposesd in close contact with an earthed conductive stage having a size smaller than the substrate size to thereby allow the peripheral edge portions thereof to be apart from the conductive stage, and a voltage of the same polarity as the spacer charge polarity is applied to the transparent electrodes on the substrate.

In a fourth aspect, the invention provides a method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, and comprising the step of removing water from the substrate onto which spacers are to be sprayed, and the step of bringing the substrate into close contact with an earthed conductive stage and then spraying spacers while applying a voltage of the same polarity as the spacer charge polarity to the transparent electrodes on the substrate.

In a fifth aspect, the invention provides a method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, and comprising the step of disposing the substrate into close contact with an earthed conductive stage and spraying spacers while applying a voltage of the same polarity as the spacer charge polarity to the transparent electrodes on the substrate, the substrate before and during spacer spraying showing characteristics such that, when a voltage of 1 kV is applied to the transparent electrodes on the substrate, the current flowing between the transparent electrodes on the substrate and the conductive stage is not more than $10^{-6}$ A.

In a sixth aspect, the invention provides a method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, wherein, in spraying positively or negatively charged spacers onto the substrate, the substrate is disposed into close contact with an earthed conductive stage, a voltage of the same polarity as the spacer charge polarity is applied to the transparent electrodes on the substrate, then the terminals of the voltage application apparatus are disconnected from the transparent electrodes, and spacer spraying is carried out while the electric charge remains on the substrate.

In a seventh aspect, the invention provides a method for producing a liquid crystal display device comprising spraying spacers onto at least one of a first substrate comprising at least pattern-forming transparent electrode and an alignment layer and a second substrate to be disposed opposingly above the first substrate and filling a liquid crystal into the space between both the substrates, wherein, in spraying positively or negatively charged spacers onto the substrate, the substrate is disposed into close contact with an earthed conductive stage, a voltage of the same polarity as the spacer charge polarity is applied to the transparent electrodes on the substrate while maintaining that state of voltage application for a certain period of time and then spacer spraying is carried out while maintaining that state of voltage application.

In an eighth aspect, the invention provides a method for producing a liquid crystal display device comprising spraying spacers onto a first substrate comprising at least pattern-forming transparent electrode, a conductive black matrix, an overcoat layer and an alignment layer, and filling a liquid crystal into the space between the first substrate and a second substrate comprising thin film transistors formed thereon which is to be disposed opposingly above the first substrate, wherein the first substrate has transparent electrode-free etched regions formed within the transparent electrodes over and within the expanse of the corresponding conductive black matrix areas, and, in spraying positively or negatively charged spacers onto the first substrate, a voltage (V1) is applied to the conductive black matrix and a voltage (V2) to the transparent electrodes, both the voltages V1 and V2 being positive ones and satisfying the relation V1<V2, when the spacer charge polarity is positive, or both V1 and V2 being negative voltages and satisfying the relation V1>V2, when the spacer charge polarity is negative.

In a ninth aspect, the invention provides a method for producing a liquid crystal display device comprising spraying spacers onto a first substrate comprising at least pattern-forming transparent electrodes, a black matrix, an overcoat layer and an alignment layer, and filling a liquid crystal into the space between the first substrate and a second substrate comprising thin film transistors formed thereon which is to be disposed opposingly above the first substrate, wherein the first substrate has transparent electrode-free etched regions formed within the transparent electrodes over and within the expanse of the corresponding conductive black matrix areas, and, in spraying positively or negatively charged spacers onto the first substrate, the first substrate is disposed into close contact with an earthed conductive stage having a volume resistance of not more than $10^{10}$ Ωcm and a voltage of 200 V to 5 kV having the same polarity as the spacer charge polarity is applied to the transparent electrodes.

In a tenth aspect, the invention provides a method for producing a liquid crystal display device comprising spraying spacers onto a first substrate comprising at least pattern-forming transparent electrodes, and filling a liquid crystal into the space between the first substrate and a second substrate comprising thin film transistors formed thereon which is to be disposed opposingly above the first substrate, wherein the first substrate has isolated, electrically floating, transparent electrodes not connected with the surrounding transparent electrodes but formed within the transparent electrodes within the expanse of the corresponding black matrix areas as formed on the first or second substrate, and, in spraying positively or negatively charged spacers onto the first substrate, the first substrate is disposed in close contact with an earthed conductive stage having a volume resistance of not more than $10^{10}$ Ωcm and a voltage of the same polarity as the spacer charge polarity is applied to the transparent electrodes other than the isolated transparent electrodes on the first substrate.

In an eleventh aspect, the invention provides a method for producing a liquid crystal display device according to the first, second, third, fourth, fifth, sixth, seventh, eighth, ninth or tenth aspect of the invention, wherein spacers are charged positively or negatively by being sprayed through a pipeline made of a resin or a metal using a gas as a medium.

In a twelfth aspect, the invention provides a method for producing a liquid crystal display device according to the first, second, third, fourth, fifth, sixth, seventh, eighth, ninth, tenth or eleventh aspect of the invention, wherein spacers are fixed on the substrate surface by heating.

In a thirteenth aspect, the invention provides liquid crystal display devices produced by the method for producing a liquid crystal display device according to the first, second, third, fourth, fifth, sixth, seventh, eighth, ninth, tenth, eleventh or twelfth aspect of the invention.

EXPLANATION OF CODES

Figure 1:
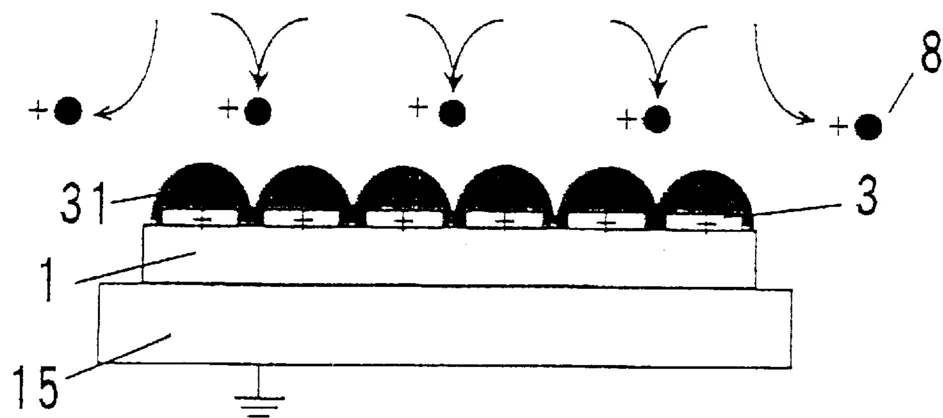
FIG. 1 is a schematic sectional view illustrating an equipotential surface on the substrate when the stage is earthed.

1—insulating substrate (glass substrate)
1*a*—first substrate
1*b*—second substrate
2—polarizer
3—display electrode (linear transparent electrode, pixel electrode)
3*a*—isolated transparent electrode
4—color filter
5—black matrix (conductive black matrix)
6—overcoat layer
7—liquid crystal
8—spacer
9—alignment layer
10—chamber
12—voltage application apparatus (direct current source)
13—gate electrode
14—drain electrode
14*a*—source electrode
15—conductive stage (stage)
16—semiconductor layer
17—pipeline
18—electrometer
19—spacer metering (dosing) feeder
20—parting line
21—dummy electrode
22—etched region
23—insulation layer
24—etched area
26—black matrix picture frame
28—dummy electrode region
29—display pixel (black matrix opening)
30—display area
31—equipotential line (equipotential surface)

DISCLOSURE OF THE INVENTION

In the following, the present invention is described in detail.

The method of liquid crystal display device (hereinafter referred to also as LCD for short) production according to the first aspect of the present invention comprising spraying spacers onto at least one of a first substrate comprising at least pattern-forming transparent electrodes and a second substrate to be disposed opposingly above the first substrate and filling a liquid crystal into the space between both the substrates comprises, in spraying positively or negatively charged spacers onto the substrate, disposing the substrate in close contact with an earthed conductive stage having a volume resistance of not more than $10^{10}$ Ωcm and applying, to the transparent electrodes, a voltage of 200 V to 5 kV having the same polarity as the spacer charge polarity.

The method of LCD production according to the first aspect of the invention is applied to the production of LCDs by spraying spacers onto at least one of a first substrate comprising at least pattern-forming transparent electrodes and a second substrate to be disposed opposingly above the first substrate and filling a liquid crystal into the space between both the substrates.

The above transparent electrodes are not particularly restricted but may be, for example, linearized transparent electrodes. The above pattern-forming transparent electrodes are not particularly restricted but may be, for example, stripe-shaped electrodes constituted of linear transparent electrodes disposed in parallel as formed on a substrate. The stripe-shaped electrodes are those used as the so-called display electrodes in liquid crystal display devices. The areas for displaying in a liquid crystal display device are display areas and each comprises the transparent electrode-forming area and the vicinity thereof.

The substrate to which the method of LCD production according to the first aspect of the present invention can be applied may be any one having at least pattern-forming transparent electrodes formed thereon, without any particular restriction as to the shape thereof, whether substrate-like or film-like, for instance. Thus, there may be mentioned, among others, color filter substrates having a black matrix, color filters, an overcoat layer, pattern-forming transparent electrodes and an alignment layer, and substrates having a black matrix, an overcoat layer, pattern-forming transparent electrodes and an alignment layer. When a metal substrate is used, however, it is necessary to provide an insulation layer so that the electrodes formed on the surface may not be short-circuited.

Thus, when the method of LCD production according to the first aspect of the invention is applied to the production of STN type LCDs, the method can be applied to either common electrode substrates or segment electrode substrates facing thereto on condition that they have pattern-forming transparent electrodes at a minimum.

The spacers mentioned above are not particularly restricted but include, among others, metal particles; synthetic resin particles; inorganic particles; opaque synthetic resin particles containing a pigment dispersed therein; dye-colored particles; particles showing adhesiveness upon heating or light irradiation; and metal, synthetic resin or inorganic particles the surface of which is metal-plated. The spacers serve to adjust the cell thickness in liquid crystal display devices.

In applying the method of LCD production according to the first aspect of the invention to the production of TFT type LCDs, transparent electrode-free areas are formed, by etching, for instance, at sites just below the black matrix sites of the color filter substrate, which is a common-electrode substrate, and spacers are then disposed on the substrate having such areas by the method of LCD production according to the first aspect of the invention. While the common electrode substrate in ordinary TFT type liquid crystal display devices comprises a solid electrode, it is possible to drive even an electrode substrate comprising etched transparent electrodes in the same manner as in ordinary TFT type liquid crystal display devices by applying the same voltage to the respective electrodes.

The method of LCD production according to the first aspect of the invention is carried out by disposing, in spraying positively or negatively charged spacers onto a substrate, the substrate in close contact with an earthed conductive stage (referred to also as stage for short) having a volume resistance of not more than $10^{10}$ Ωcm and applying a voltage of 200 V to 5 kV having the same polarity as the spacer charge polarity to the transparent electrodes.

By disposing the substrate in close contact with the earthed conductive stage having a volume resistance of not more than $10_{10}$ Ωcm, the electric potential in each gap between the transparent electrodes is reduced and an electric field suited for spacer disposition is formed, as shown in FIG. 1.

It is necessary that the volume resistance of the above conductive stage be not more than $10^{10}$ Ωcm. The substrate is may be in close contact with the conductive stage only over a certain area thereof.

The value of the voltage to be applied to the above transparent electrodes is 200 V to 5 kV. This value generally makes it possible to produce a sufficient.repulsive force against the spacer charge. Thus, precise spacer positioning can be attained. A preferred voltage is 1.5 kV to 5 kV. The kind of voltage is not particularly restricted. A direct current voltage or a pulse voltage, for instance, is suited for use.

The method of spacer spraying may be either the dry method or wet method. In view of possible leak between transparent electrodes under the influence of moisture, the dry method of spraying is preferred, however.

As the method of charging or electrifying spacers in the above-mentioned dry method of spraying, there may be mentioned, for example, the charging method which comprises causing spacers to contact with the pipeline wall repeatedly. In this charging method, stable charging can be attained by passing spacers through the pipeline by means of such a medium as compressed air or compressed nitrogen. In that case, from the viewpoint of spacer charging and of prevention of moisture adhesion to the substrate surface, the medium gas should preferably be in a dry state or as low as possible in moisture content.

The above pipeline may be made of a metal or a resin and it can properly be selected in correlation with the spacer charge polarity and the quantity of electric charge.

The metal pipeline is not particularly restricted but includes, among others, pipelines made of a single material, such as nickel, copper, aluminum or titanium; and pipelines made of an alloy, such as stainless steel. The pipeline inside wall may have a coat of a metal, such as gold or chromium, provided by plating, for instance.

The resin pipeline is not particularly restricted but includes, among others, pipelines made of Teflon, polyvinyl chloride, nylon or the like. When a pipeline made of a highly insulating resin, such as Teflon, is used, it is preferred that such a resin pipeline be coated with a metal or a metal wire or line be inserted in the pipeline, with the metal coat or metal wire or line being earthed. This is because while charge going in and charge going out are effected by contacting of spacers with the pipeline, the charge on the resin pipeline accumulates, leading to failure to attain stable charging, if the pipeline is not earthed.

For adjusting the quantity of charge on spacers, pipelines differing in material of construction may be connected up in series.

The method of LCD production according to the second aspect of the present invention comprising spraying spacers onto at least one of a first substrate comprising at least pattern-forming transparent electrodes, a conductive black matrix and an overcoat layer and a second substrate to be disposed opposingly above the first substrate and filling a liquid crystal into the space between both the substrates comprises, in spraying positively or negatively charged spacers onto the substrate, applying a voltage (V1) to the conductive black matrix and a voltage (V2) to the transparent electrodes, both the voltages V1 and V2 being positive ones and satisfying the relation v1<V2 when the spacer charge polarity is positive, or both V1 and V2 being negative voltages and satisfying the relation V1>V2 when the spacer charge polarity is negative.

The transparent electrodes, substrates, spacers and spacer charging method mentioned above are the same as mentioned hereinabove referring to the first aspect of the invention. As explained in relation to the first aspect of the invention, the method of LCD production according to the second aspect of the invention can be applied to the production of TFT type liquid crystal display devices.

The above conductive black matrix (also referred to as black matrix) offers display areas in the manner of picture frames. The picture frame condition is formed by each area where there is no conductive black matrix.

Figure 2:
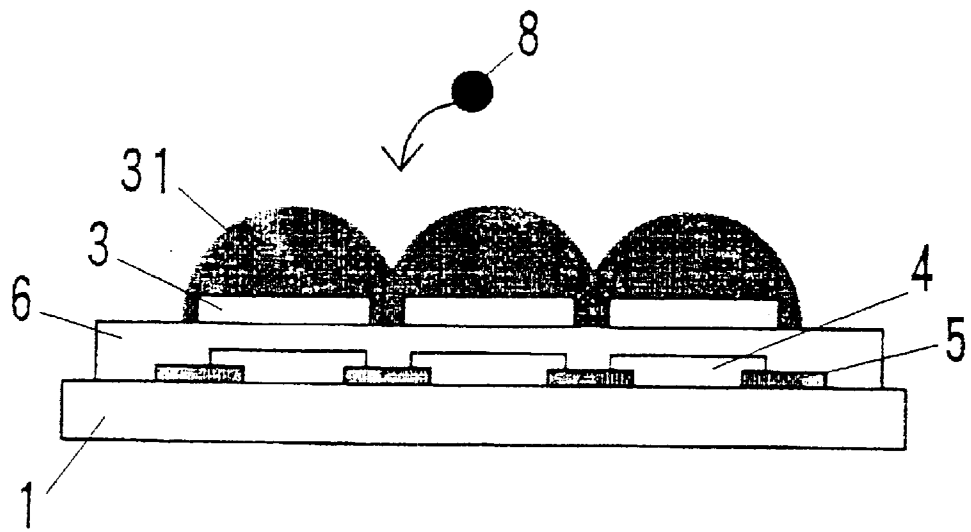
FIG. 2 is schematic view illustrating the method for producing a liquid crystal display device according to an aspect of the present invention.

The above conductive black matrix may be any conductive one, without any particular restriction. Thus, it includes, for example, those made of chromium, aluminum or carbon black. From the viewpoint of conductivity, however, those made of a metal, preferably chromium, are used more often. As shown in FIG. 2, an insulating overcoat layer is provided on the conductive black matrix. The overcoat layer is provided to prevent a short circuit between the linear transparent electrodes and the conductive black matrix and it is not particularly restricted provided that it is transparent and has an insulating power. It is made of an acrylic resin, for instance.

When the substrate is a substrate having color filters, the above overcoat layer also serves to level the color filter layer. Generally, such color filters can be formed by the pigment dispersing method or dyeing method, for instance.

By applying a voltage (V1) to the above conductive black matrix and a voltage (V2) to the transparent electrodes, an electric field suited for spacer positioning is formed, as shown in FIG. 2, in the same manner as shown in FIG. 1, irrespective of whether the substrate is disposed in close contact with an earthed conductive stage having a volume resistance of not more than $10^{10}$ Ωcm or not.

When the spacer charge is positive, for instance, positive voltages are selected as both the voltages and the condition V1<V2 is satisfied, whereby a strong repulsive force is produced on the transparent electrodes and a weak repulsive force at sites of the black matrix and spacers can be disposed at those sites of the black matrix (the situation is the same when the spacer charge is negative).

The reason why the above V1 and V2 should be of the same polarity as the spacer charge polarity is that a repulsive force of the order of kV is required for controlling the positions of fall of spacers with a high level of precision. If V1 and V2 differ in polarity, the potential difference between the transparent electrodes and the black matrix will become of the order of kV and a short circuit will be formed between the transparent electrodes and the black matrix, since the overcoat layer is as thin as 2 to 5 $\mu$m; the result will be failure in forming an electric field suited for spacer positioning.

Therefore, the potential difference between V1 and V2 is preferably not more than 100 V. Even though the potential difference is as small as 100 V or less, it is a potential difference in the repulsive phase, hence the intended spacer positioning control can be accomplished.

Thus, when the polarity of the charge of spacers to be sprayed is positive (+), the voltage (V1) applied to the conductive black matrix and the voltage (V2) applied to the transparent electrodes are selected so that the relation V1<V2 may be satisfied.

By doing so, the repulsive force appearing at the black matrix sites becomes relatively smaller than the repulsive force appearing at the transparent electrode sites, and the spacers are disposed at the black matrix sites, namely in each gap between the neighboring, pattern-forming transparent electrodes.

When the polarity of the charge of spacers to be sprayed is negative (–), the voltage (V1) applied to the conductive black matrix and the voltage (V2) applied to the transparent electrodes are selected so that the relation V1>V2 may be satisfied.

The above V1 and V2 are both positive when the polarity of the charge of spacers to be sprayed is positive (+) and, when the polarity of the charge of spacers to be sprayed is negative (–), they are both negative. Thus, the potential difference between V1 and V2 is produced by using the same polarity as the spacer charge polarity, not by using the opposite polarity relative to the spacer charge polarity or using the positive (+) polarity and negative (–) polarity relative to the earth potential.

The reason why the potential difference between V1 and V2 is produced using the same polarity as the spacer charge polarity is as follows.

When the above potential difference between V1 and V2 is produced using the opposite polarity relative to the spacer charge polarity or using the positive (+) polarity and negative (–) polarity relative to the earth potential, spacers first undergo the influence of gravity, hence their speed of falling tends to increase.

On the contrary, when the potential difference between V1 and V2 is produced using the same polarity as the spacer charge polarity, the speed of spacer falling tends to be suppressed under the influence of the resulting repulsive force. When the potential difference between V1 and V2 remains the same, a slower falling speed makes it possible to achieve more precise spacer positioning.

More specifically, when, for instance, the spacer charge polarity is negative (–) and a potential difference of 50 V is to be given between V1 and V2, the potential difference of 50 V is made not between +25 V and –25V but between –1000 V and –1050 V, which are of the same polarity as the spacer charge polarity. In the initial stage of falling, namely when they are far from the substrate, spacers undergo only the influence of an average electric field El resulting from the voltages –1000 V and –1050 V, since, in that stage, there is no substantial influence of the potential difference as yet. Therefore, spacers with a charge quantity Q undergo only the influence of the attractive or repulsive force in the direction of falling (vertical direction) as resulting from the electric field El (F1=QE1). Then, as the spacers approach the substrate, the route of spacer falling is bent (F2=QE2) by the influence of the potential difference E2 (50 V) between –1000 V and –1050 V.

Therefore, the speed of spacers falling into the potential difference E2 can be varied by selecting the voltage values for producing the potential difference between V1 and V2. Thus, by adjusting the voltage values V1 and V2 and the potential difference therebetween, it is possible to control the spacer positioning even with a small potential difference. The gist of the second aspect of the present invention lies therein. Namely, high precision spacer positioning can be attained by positively adjusting the spacer falling speed by forming, on the substrate, an electric repulsive force field of the same polarity as the spacer charge polarity, not based only on the idea of polarity due attractive force/repulsive force as in the prior art.

The potential difference between the above V1 and V2 is preferably not more than 100 V. As mentioned above, the electric potentials V1 and V2 are of the same polarity as the spacer charge polarity and, therefore, even when the potential difference is as small as 100 V or less, the spacer positioning control can be accomplished. Since the overcoat layer is as thin as 2 to 5 μm, breakdown tends to occur and the yield may become reduced when the potential difference is in excess of 100 V.

The quantity of spacer charge is preferably 3 to 50 μC/g, the polarity being either positive (+) or negative (−). This spacer charge quantity range does not mean a dispersion in spacer charge quantity but means that the average spacer charge quantity is within the above range. When it is less than 3 μC/g, spacers may fail to make a sufficient bend, hence a high level of positioning may not be obtained in some instances. If, conversely, it is in excess of 50 μC/g, the repulsive force in an electric field for repulsive force exertion will become too strong for a sufficient number of spacers to fall on the substrate, hence a prolonged period of time will be required for spacer spraying; the positioning precision also tends to become worse since the spacers show a certain extent of dispersion in spacer charge quantity.

The spacer charge quantity can be, measured using a model E-SPART analyzer (product of Hosokawa Micron), for instance.

In the above first and second aspects of the present invention, the substrate preferably has a dummy electrode.

Figure 3:
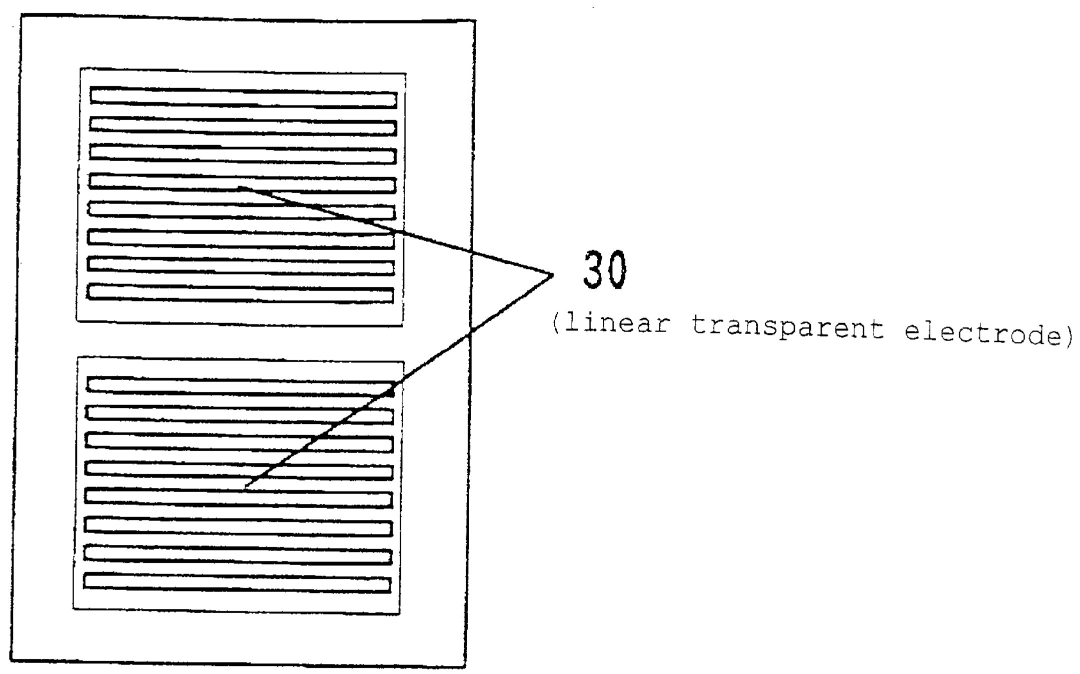
FIG. 3 is a schematic plan view, seen from above, of a substrate to be used in the liquid crystal display device production method according to an aspect of the invention on which substrate no dummy electrode is formed.
Figure 4:
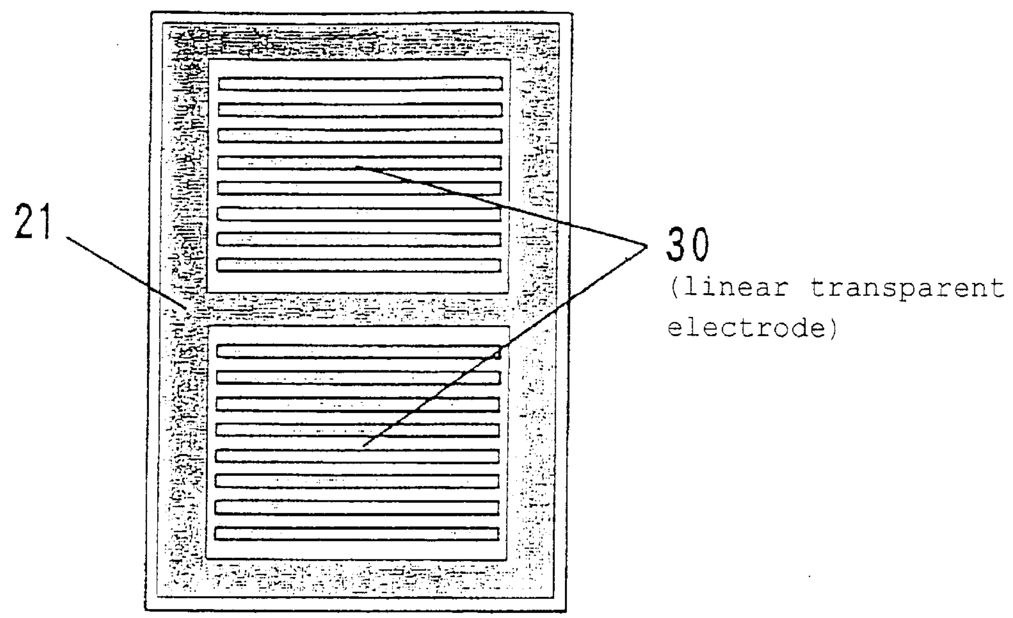
FIG. 4 is a schematic plan view, seen from above, of a substrate to be used in the liquid crystal display device production method according to an aspect of the invention on which substrate a dummy electrode is formed and the transparent electrodes are not connected with the dummy electrode.
Figure 5:
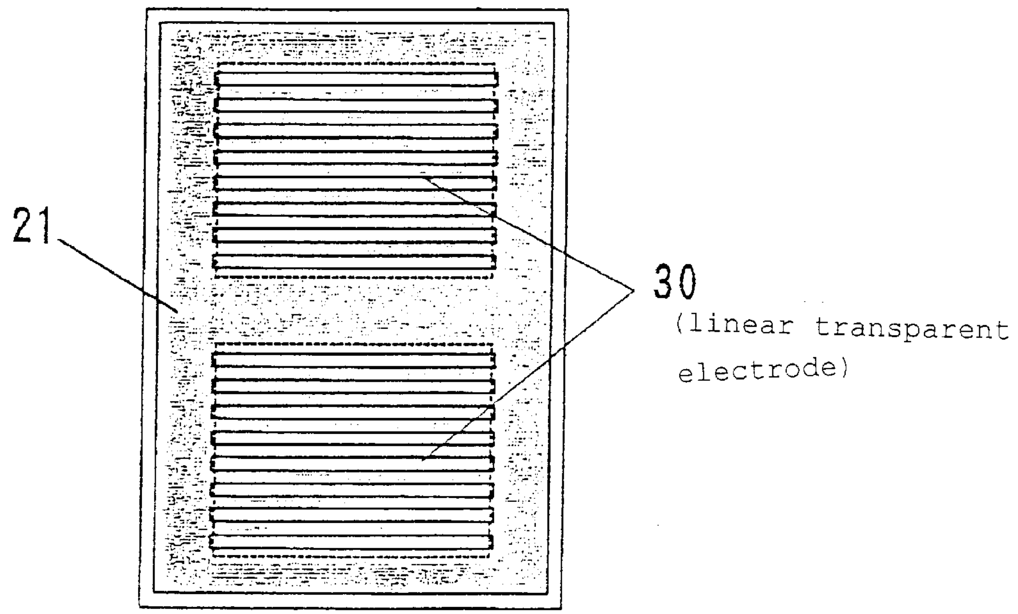
FIG. 5 is a schematic plan view, seen from above, of a substrate to be used in the liquid crystal display device production method according to an aspect of the invention on which substrate a dummy electrode is formed and the transparent electrodes are connected with the dummy electrode.

FIGS. 3 to 5 each is a plan view showing a substrate of such type that two display substrates are produced from one substrate. The substrate shown in FIG. 4 or FIG. 5 is of the type such that a dummy electrode is provided so as to surround each display area. Generally, this dummy electrode is formed for preventing the alignment layer from being damaged by sparking due to static electricity in the production step.

In FIG. 3, there is no dummy electrode. In FIG. 4, there is a dummy electrode but the transparent electrodes are not connected with the dummy electrode. In FIG. 5, there is a dummy electrode formed and this is connected with the transparent electrodes.

Substrates having a dummy electrode in such a manner (FIG. 4 or FIG. 5) are used so that the number of spacers in the outermost region of each display area may be prevented from decreasing to thereby attain a uniform overall cell gap.

Figure 6:
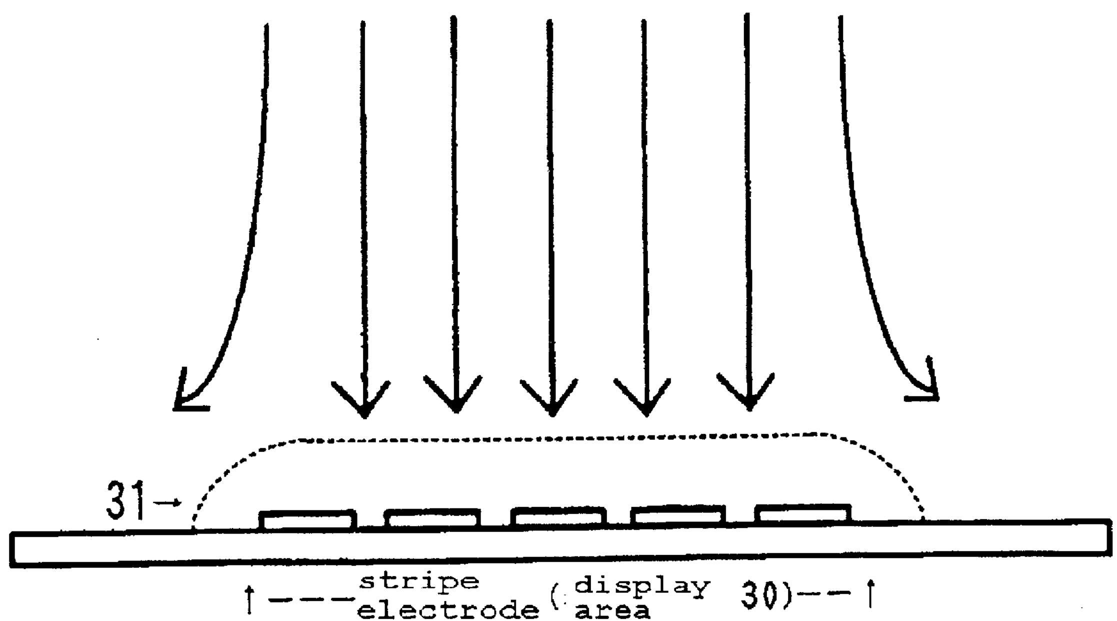
FIG. 6 is a schematic view illustrating lines of electric force as seen with a substrate having transparent electrodes alone formed on an overcoat layer when different voltages of the same polarity are respectively applied to the transparent electrodes and the black matrix.

When there is no dummy gap formed, the number of spacers in the outermost region of the display area may easily be reduced for the following reason. In the central portion of the display area in which the transparent electrodes are formed, the repulsive force-inducing electric field is uniform, as shown in FIG. 6, and, therefore, the number of spacers disposed between each two transparent electrodes is stabilized. On the periphery (outside) of the display area, however, no repulsive force exists, so that spacers occurring in the vicinity thereof may readily be repelled out of the display area; as a result, the number of spacers in the outermost region tends to decrease.

In the central portion of the display area as well, the number of positioned spacers becomes smaller due to a repulsive force as compared with the case of no voltage application and, in particular, particles with a large charge quantity are repelled out of the substrate.

Figure 7:
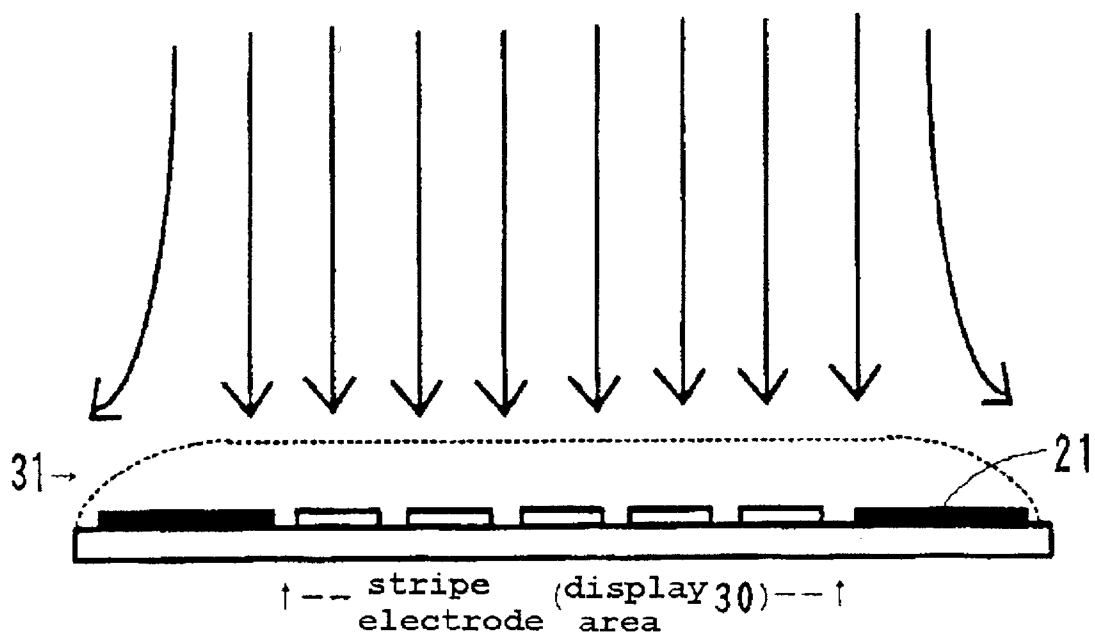
FIG. 7 is a schematic view illustrating lines of electric force as seen with a substrate having transparent electrodes and a dummy electrode formed on an overcoat layer when different voltages of the same polarity are respectively applied to the transparent and dummy electrodes and the black matrix.

However, when a voltage similar to that applied to the transparent electrodes within the display area is applied to a dummy electrode disposed outside the display area, the same electric field as over the display area extends to the dummy electrode region, as shown in FIG. 7, and, accordingly, the number of spacers within the dummy electrode region will not decrease appreciably but spacers are disposed uniformly within the whole display area. As a result, when a liquid crystal display device is fabricated using such substrate, the cell gap becomes uniform throughout the display area, so that high display uniformity is insured and high-contrast display is realized. In FIG. 6 and FIG. 7, the underlying overcoat layer, black matrix layer and so forth are omitted.

When the transparent electrodes are connected with the dummy electrode, the same voltage is applied to the transparent electrodes, so that uniform spacer disposition becomes possible, as mentioned above.

When the transparent electrodes are not connected with the dummy electrode, it is preferred that a voltage different from that applied to the transparent electrodes be applied to the dummy electrode.

The reason is as follows. When the display area is apart from the dummy electrode, for instance, spacers may escape into gaps therebetween. Therefore, in such a case, it becomes necessary to apply, to the dummy electrode, a stronger repulsive force causing voltage than that applied to the display area to thereby drive back spacers, by repulsion, to the outermost region of the display area.

The mode of connection of the transparent electrodes with the dummy electrode includes, but is not limited to, the mode in which one end of each transparent electrode is connected with the dummy electrode, the mode in which both ends of each transparent electrode are connected with the dummy electrode, and the mode in which the aligned transparent electrodes are connected alternately at one end and at the other with the dummy electrode, for instance. To sum up, the respective transparent electrodes may be connected in every possible manner with the dummy electrode.

The method of LCD production according to the third aspect of the present invention comprising spraying spacers onto at least one of a first substrate comprising at least pattern-forming transparent electrodes, an alignment layer and one or more display areas and a second substrate to be disposed opposingly above the first substrate and filling a liquid crystal into the space between both the substrates comprises disposing, in spraying positively or negatively charged spacers onto the substrate, the substrate in close contact with an earthed conductive stage having a size smaller than the substrate size to thereby allow the peripheral edge portions thereof to be apart from the conductive stage, and applying a voltage of the same polarity as the spacer charge polarity to the transparent electrodes on the substrate.

The transparent electrodes, substrates, spacers and spacer charging method mentioned above are the same as mentioned hereinabove referring to the first aspect of the invention. As explained in relation to the first aspect of the invention, the method of LCD production according to the third aspect of the invention can be applied to the production of TFT type liquid crystal display devices.

Figure 8:
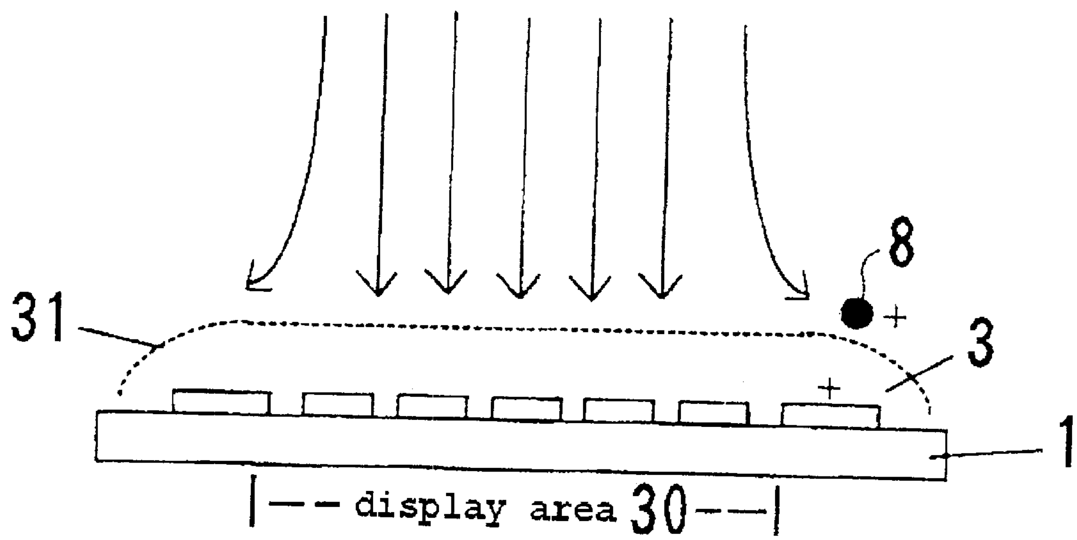
FIG. 8 is a schematic sectional view illustrating an equipotential surface on the substrate in the conventional method for producing a liquid crystal display device.

When, in spraying spacers, merely the charged spacers are of the same polarity as that of the voltage-applied transparent electrodes, for example when the spacer charge polarity is positive (+) and the voltage applied to the transparent electrodes is of positive polarity (+), as shown in FIG. 8 (the color filters, overcoat and so forth not shown), the total number of spacers dispersed on the substrate becomes smaller and stabilized as compared with the case of no voltage application to the transparent electrodes.

However, in the edge portions of the substrate where there is no transparent electrode, no repulsive force operates, so that spacers occurring in the vicinity of the periphery of the substrate are repelled out of the substrate. Therefore, the number of spacers occurring in the vicinity of the periphery of the display area becomes insufficient, so that the liquid display device may have a reduced cell thickness on that periphery, causing display unevenness.

Figure 9:
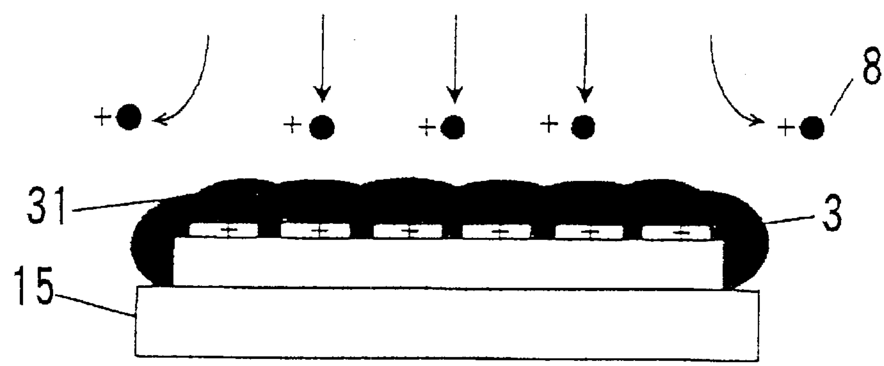
FIG. 9 is a schematic sectional view illustrating an equipotential surface on the substrate when the stage is not earthed.

In the production of STN type LCDs, for instance, when, in spraying charged spacers, the substrate comprising at least pattern-forming transparent electrodes and an alignment layer and having a display area or areas is not earthed or such substrate is disposed in close contact with an unearthed conductive stage, as shown in FIG. 9, the electric potential between the electrodes as resulting from application of a voltage of the same polarity as the charged spacers' polarity to the pattern-forming transparent electrodes will not lower but the electric field formed over the substrate is nearly uniform (shown in FIG. 9 as an equipotential surface for a certain electric potential), hence a sufficient electric potential distribution cannot be obtained and no selective spacer disposition is effected.

On the other hand, in spraying charged spacers, it is id possible to dispose the spacers in gaps between the transparent electrodes by means of a repulsive force by disposing a substrate comprising at least pattern-forming transparent electrodes and an alignment layer in close contact with an earthed conductive stage and applying a voltage of the same polarity as the charged spacers' polarity to the transparent electrodes on the substrate. In this case, the disposition of the substrate in close contact with the earthed conductive stage leads to formation of an electric field suited for spacer disposition.

In other words, when a + voltage is applied to the transparent electrodes, the electric potential in the gap between each neighboring transparent electrodes becomes sufficiently lower than the electric potential of the transparent electrodes, since the stage, which is earthed, always maintains a zero electric potential. An electric field suited for spacer disposition (in FIG. 1, shown as an equipotential surface for a certain electric potential) is thus formed. Namely, electric force lines, though not shown in FIG. 9 and FIG. 1, are formed in the gap between each transparent electrode and the neighboring one and charged spacers are disposed in each gap between the transparent electrodes under the action of the electric force lines and of the repulsive force from the substrate as a whole upon the charged spacers with the same polarity as the voltage applied to the transparent electrodes (the alignment layer and so forth not shown).

The above-mentioned stage is required to have a volume resistance of not more than $10^{10}$ Ωcm and the above-mentioned substrate may be in close contact with the stage over a certain percentage of the area of the substrate.

Meanwhile, a phenomenon was observed which consisted in the decrease in number of spacers in the vicinity of the periphery of the display area upon exertion of a repulsive force on the spacers as a result of formation of an electric field by a voltage applied to the pattern-forming transparent electrodes.

In the production of liquid crystal display devices, they experience a step of applying a certain load thereto. If, in that step, the number of spacers becomes irregular or uneven in some part of the substrate, the load per spacer varies in that part to cause varying distortion of spacers, leading to cell thickness variations and to uneven display by the liquid crystal display device obtained.

The cause of such variation in the number of spacers in the vicinity of the periphery of the display area is that when a voltage of the same polarity as the spacer charge polarity is applied to the pattern-forming transparent electrodes to dispose spacers in the gaps among them, a force (repulsive force) acts so as to repel the spacers falling over the display area out of the display area. In the vicinity of the periphery of the display area, in particular, as shown in FIGS. 1, 8 and 9, those spacers which are to be disposed in the peripheral regions of the display area escape to the outside, since no replusive force occurs on that substrate region which is outside the display area.

Figure 10:
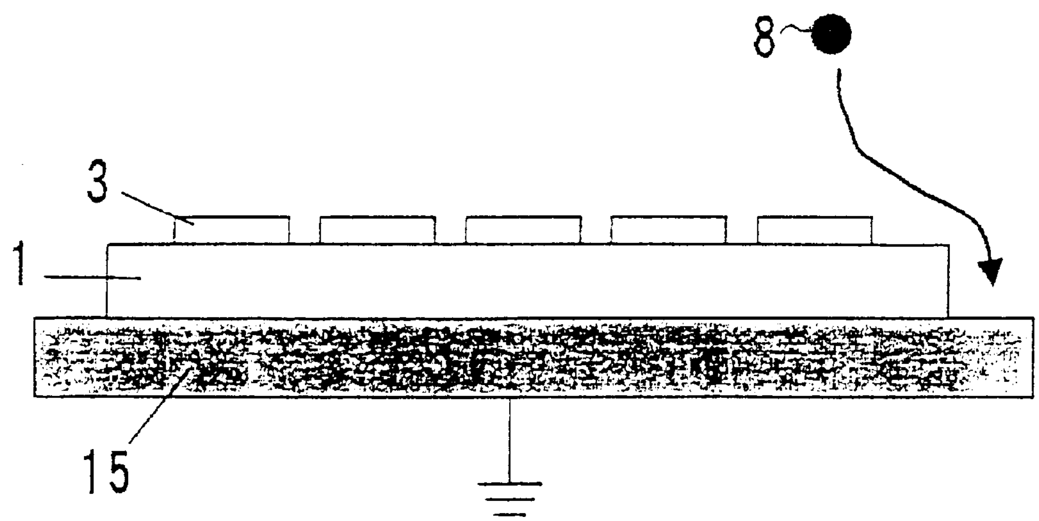
FIG. 10 is a schematic sectional view illustrating a relationship between the substrate and the stage in the method for producing a liquid crystal display device.

Thus, as shown in FIG. 10, a repulsive force acts on spacers over the display area since a voltage of the same polarity as the spacer charge polarity is applied on the transparent electrodes within the substrate, while the conductive stage, which is at an earth potential, exerts an attractive force on charged spacers. Therefore, a repulsive force from within the substrate and an attractive force from the conductive stage act on the periphery of the substrate and both the effects cause spacers to escape from within the substrate.

Figure 11:
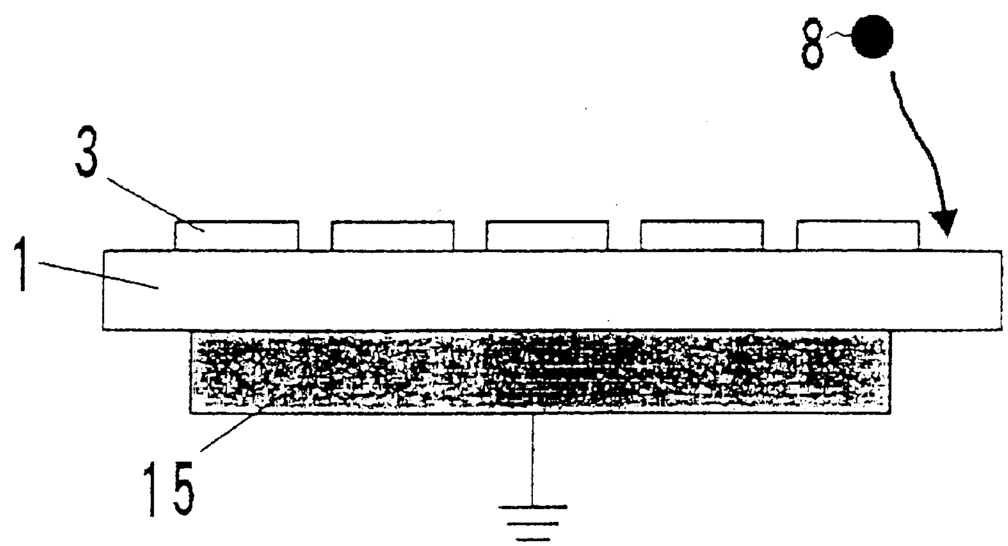
FIG. 11 is a schematic sectional view illustrating a relationship between the substrate and the stage in the method for producing a liquid crystal display device.

In accordance with the third aspect of the present invention, these phenomena are prevented, as shown in FIG. 11, by disposing, in spraying positively or negatively charged spacers onto the substrate, the substrate in close contact with an earthed conductive stage having a size smaller than the substrate size to thereby allow the peripheral edge portions thereof to be apart from the conductive stage, and applying a voltage of the same polarity as the spacer charge polarity to the transparent electrodes on the substrate, whereby the effect of earthing on the edge portions of the substrate as resulting from the conductive stage is weakened and spacers rather tend to be attracted by the electric potential of the transparent electrodes. Thus, the decrease in the number of spacers disposed on the periphery of the substrate can be prevented as compared with the case of the conductive stage having a size larger than the substrate size.

The earthed conductive stage preferably has a volume resistance value of not more than $1\times10^{10}$ Ωcm. When it is in excess of $1\times10^{10}$ Ωcm, the whole substrate acquires an electric potential close to that of the transparent electrodes, so that the spacer positioning accuracy becomes poor.

The state that the peripheral edge portions of the substrate is apart from the conductive stage is a state such that the substrate is extending beyond the conductive stage, as shown in FIG. 11.

If there is an electrically isolated electrode, spacers will be dispersed in that portion concentratedly. Therefore, when a voltage of the same polarity as the spacer charge polarity is applied to the transparent electrodes formed on the substrate, the voltage is preferably applied to all the transparent electrodes so that no electrically isolated electrode may occur.

The voltage to be applied to the transparent electrodes on the substrate is preferably several hundred volts to several thousand volts. When the voltage applied is excessively low, it becomes difficult to control the route of falling of spacers. When it is excessively high and when a black matrix is employed, short circuiting may occur between the transparent electrodes and the black matrix in some instances.

The substrate onto which spacers are to be sprayed may be one having a black matrix formed thereon, and the black matrix may be an insulating one or a conductive one. In any case, the same good effects as mentioned above can be obtained.

The above black matrix is not particularly restricted but includes the same ones as those already mentioned hereinabove.

It is preferred, however, that the above black matrix be a conductive one and that the above conductive stage comprise one or more parts each smaller in size than the frame-like periphery of each display area on the substrate. In that case, the number of spacers disposed in the peripheral region of the substrate can be more reliably prevented from decreasing.

Figure 12:
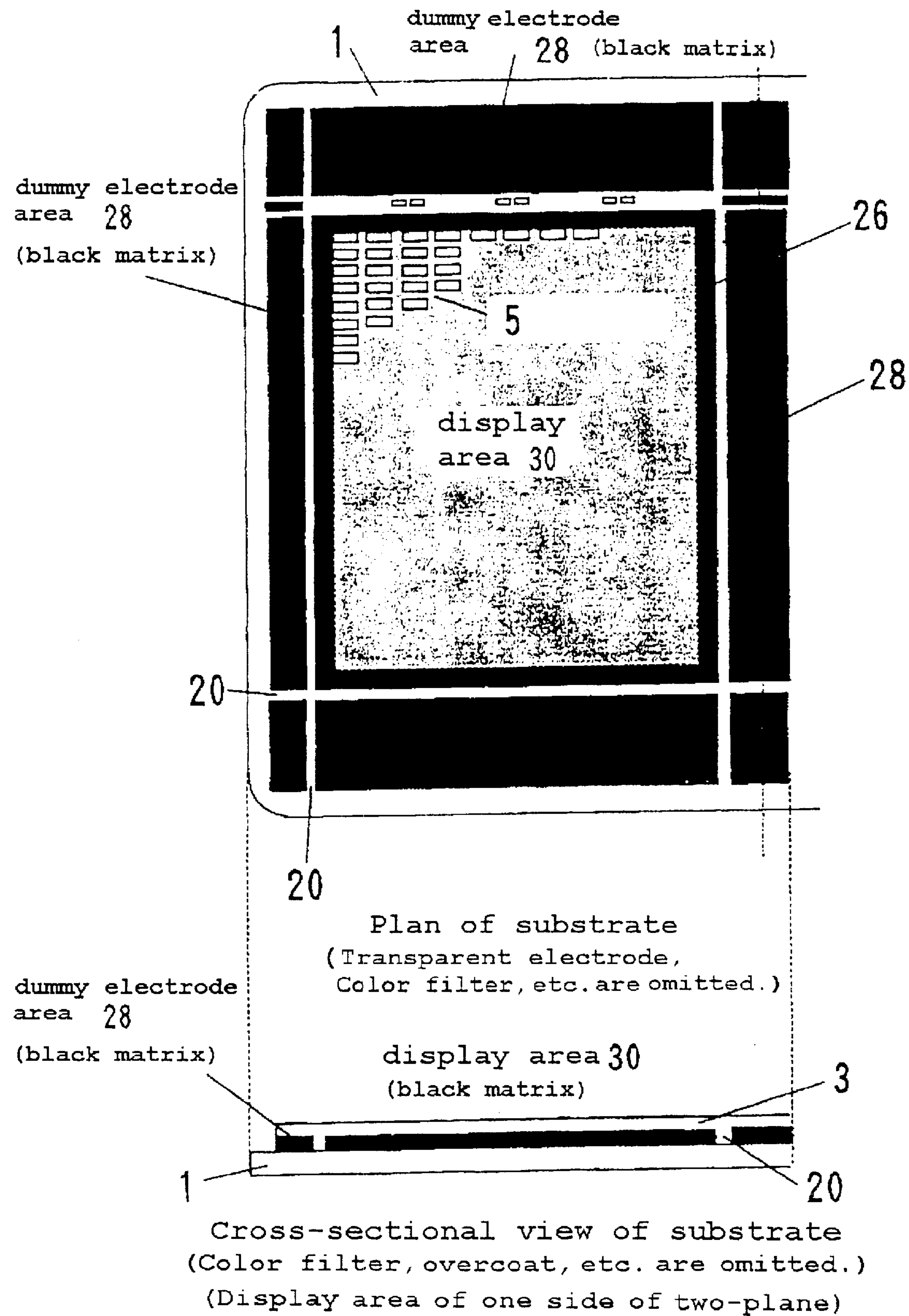
FIG. 12 is a schematic view, on a horizontal plane and in section, illustrating the picture frame-like state of the black matrix on an ordinary common electrode substrate in the method for producing a liquid crystal display device according to an aspect of the present invention.

FIG. 12 is a schematic view, on a horizontal plane and in section, illustrating the picture frame-like state of the black matrix on an ordinary common electrode substrate in the method for producing a liquid crystal display device according to the present invention. At least one of the first substrate and the second substrate to be disposed opposingly over the first substrate is a color filter substrate for LCD production and a black matrix is formed thereon, as shown in FIG. 12. The black matrix demarcates pixels in a latticework manner within the display area. Further, in FIG. 12, parting lines are provided and the regions outside the parting lines constitute a dummy electrode region comprising dummy electrodes provided outside the display area on the substrate. The parting lines serves as basis lines in cutting the first and second substrates after alignment thereof.

In some cases, at a dummy electrode site or sites outside the picture frame state region of the above black matrix, there may remain a black matrix as a solid mask. In that case, the position of the black matrix and the region comprising the transparent electrodes are almost identical with each other, as schematically shown in section in FIG. 12.

In a color filter substrate for LCD production having such constitution, even the use of a smaller conductive stage than the region in which a conductive black matrix is formed results in extension of the effect of the earthed conductive stage to the whole black matrix region, whereby the electric potential of the conductive black matrix lowers. Accordingly, the conductive black matrix region can relay the effect of the conductive stage.

Therefore, even when the conductive stage is smaller than the substrate, an electric field suited for spacer positioning is formed in the region where the conductive black matrix exists.

Since, on that occasion, the region outside the conductive black matrix picture frame is not earthed, the electric potential of the glass portion of the substrate is influenced by the voltage applied to the transparent electrodes and increases in the direction such that the electric potential approaches the electric potential of the transparent electrodes. The state in which the region outside the picture frame region of the conductive black matrix is not earthed corresponds, for example, to the case where the conductive black matrix, though present, is divided by parting lines, or the case where there is no conductive black matrix portion outside the conductive black matrix picture frame.

When the electric potential within the display area is compared with that outside the display area in such state, there exist within the display area a high electric potential due to the high voltage applied to the transparent electrodes and a low electric potential between respective two neighboring transparent electrodes.

Figure 13:
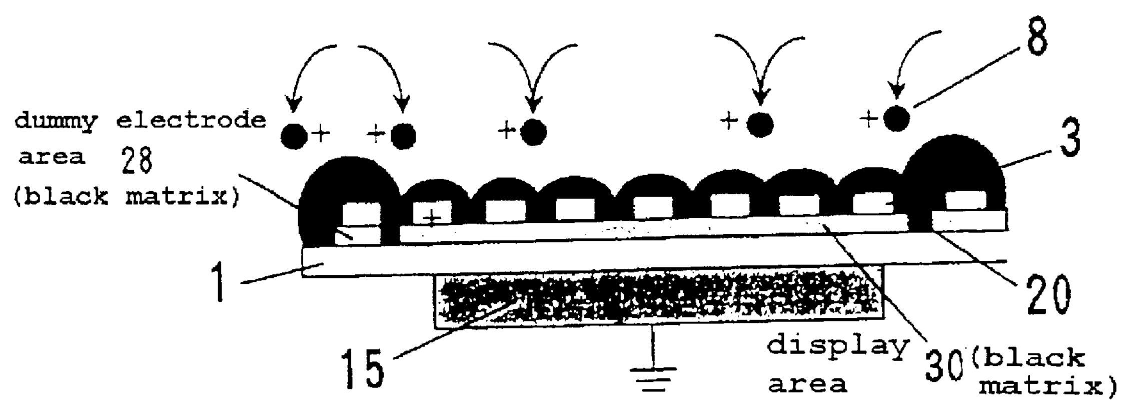
FIG. 13 is a schematic sectional view illustrating an equipotential surface on the substrate in the method for producing a liquid crystal display device according to an aspect of the present invention.

On the other hand, outside the display area, when dummy electrodes are formed, as shown in FIG. 13, the dummy electrodes and the glass portion of the substrate both have a high electric potential. Therefore, as far as the whole substrate is concerned, a high electric potential region is formed outside the display area and a low electric potential region within the display area.

As a result, the high electric potential region outside the display area serves as a wall against the repulsive force and inhibits spacers occurring within the display area from escaping out of the display area, whereby the number of spacers becomes uniform within the display area, which results in a uniform cell thickness and a uniform display performance of the product liquid crystal display device.

Even in cases where the substrate onto which spacers are to be sprayed is of the gang printing type, namely it has a plurality of display areas formed thereon, the same effects as mentioned above can be produced for all display areas, if the black matrix is conductive, by providing a plurality of conductive stages each having a size such that it is within the periphery of the picture frame region of the black matrix of each display area.

In the above case, a plurality of separate conductive stages corresponding to the plurality of display areas may be provided or a plurality of separate conductive stages may be formed by providing one single conductive stage with grooves.

The area of contact between the above conductive stage and the substrate is preferably not less than 30% of the display area or areas.

When a conductive black matrix has been formed as mentioned above, an electric field suited for spacer positioning is formed over the display area even when a conductive stage smaller in size than the matrix region is provided. This is because the conductive black matrix takes on the effect of the conductive stage.

If the area of contact between the conductive stage and the display area (black matrix region) is too small, however, the effect of earthing may become diminished. Therefore, for forming an electric field suited for spacer disposition in the display area, the area of contact between the conductive stage and the substrate should preferably be not less than 30% of the display area or areas on the substrate. If it is less than 30%, the effect of earthing will become weak and the electric field suited for spacer disposition will break down and it will become difficult to accomplish spacer positioning in the peripheral region of each display area.

The method of LCD production according to the fourth aspect of the present invention comprising spraying spacers onto at least one of a first substrate comprising at least pattern-forming transparent electrodes and an alignment layer and a second substrate to be disposed opposingly above the first substrate and filling a liquid crystal into the space between both the substrates comprises the step of removing water from the substrate onto which spacers are to be sprayed and the step of bringing the substrate into close contact with an earthed conductive stage and spraying spacers while applying a voltage of the same polarity as the spacer charge polarity to the transparent electrodes on the substrate.

The transparent electrodes, substrates, spacers and spacer charging method mentioned above are the same as mentioned hereinabove referring to the first aspect of the invention. As explained in relation to the first aspect of the invention, the method of LCD production according to the fourth aspect of the invention can be applied to the production of TFT type liquid crystal display devices.

As explained in relation to the third aspect of the invention, in spraying charged spacers in the production of STN type liquid crystal display devices, for instance, the spacers can be disposed in the gaps between the respective two transparent electrodes by means of a repulsive force by disposing the substrate comprising at least pattern-forming transparent electrodes and an alignment layer in close contact with an earthed conductive stage and applying a voltage of the same polarity as the spacer charge polarity to the transparent electrodes on the substrate. In this case, an electric field suited for spacer disposition can be formed by bringing the substrate in close contact with the earthed conductive stage, as shown in FIG. 1.

The above stage is required to have a volume resistance of not more than $10^{10}$ Ωcm and the above substrate may be in close contact with the stage at least over a certain proportion of the surface area thereof.

In the case of STN type liquid crystal display devices, the spacer spraying is generally carried out after the step of rubbing. Since, in the rubbing step, the alignment layer surface is rubbed with a cloth-like synthetic resin or the like wound around a drum, a fibrous matter from the cloth may adhere to the substrate and, thus, the substrate may be sumitted to washing with water following the rubbing step. This water is blown off by means of an air knife, for instance. However, the substrate is not sufficiently dried in that case.

Even with a sufficiently dried substrate, a certain amount of moisture adheres to the substrate with the lapse of time, since moisture exists in the air. In that case, the amount of adhering moisture varies as the temperature and/or other factors vary.

Figure 14:
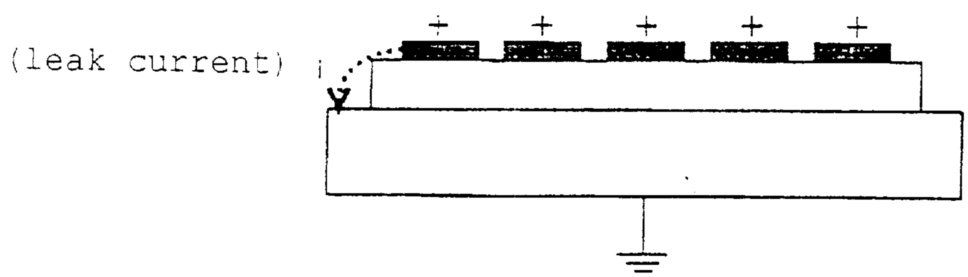
FIG. 14 is a schematic side view illustrating the case of current leakage through moisture on the substrate surface to the stage side.

In selectively disposing spacers by applying a voltage to the transparent electrodes, a high voltage of several hundred to several thousand volts is applied to the transparent electrodes. Therefore, when spacer disposition onto such a substrate with moisture adhering thereto as mentioned above is attempted in such a state as shown in FIG. 1, a microcurrent leaks, owing to the presence of the moisture, to the stage side via the moisture on the substrate surface at sites where no alignment layer is formed (sites at which an electrode is exposed) or at sites where an alignment layer is formed but is very thin, for instance, as shown in FIG. 14.

Figure 15:
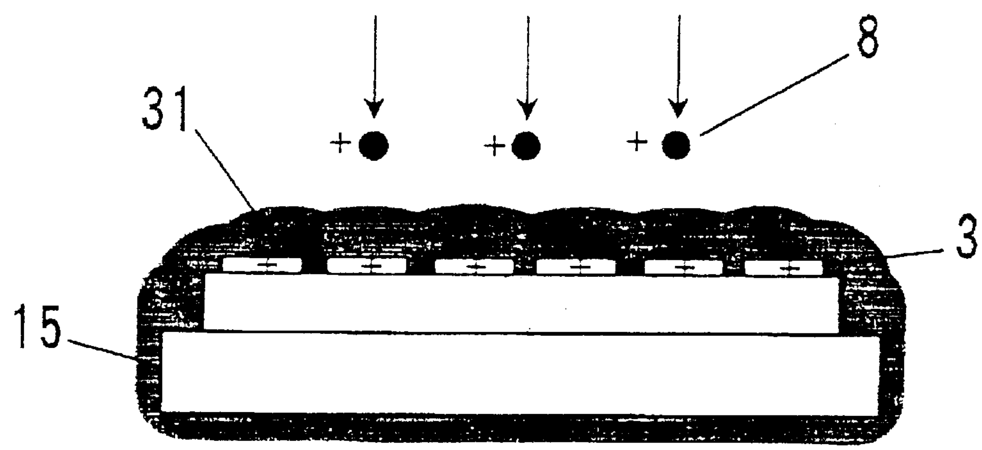
FIG. 15 is a schematic side view illustrating an equipotential surface on the substrate when the stage is earthed.

Upon occurrence of such leak, the electric field to be utilized for spacer disposition changes from such a state as shown in FIG. 1 to a state in which the conductive stage itself assumes an increased electric potential close to the electric potential of the electrodes due to static induction so that the interelectrode electric potential will not decrease. A state close to such a state as shown in FIG. 15 will thus result, hence an effective electric potential distribution cannot be obtained and selective spacer disposition is no longer possible.

Figure 16:
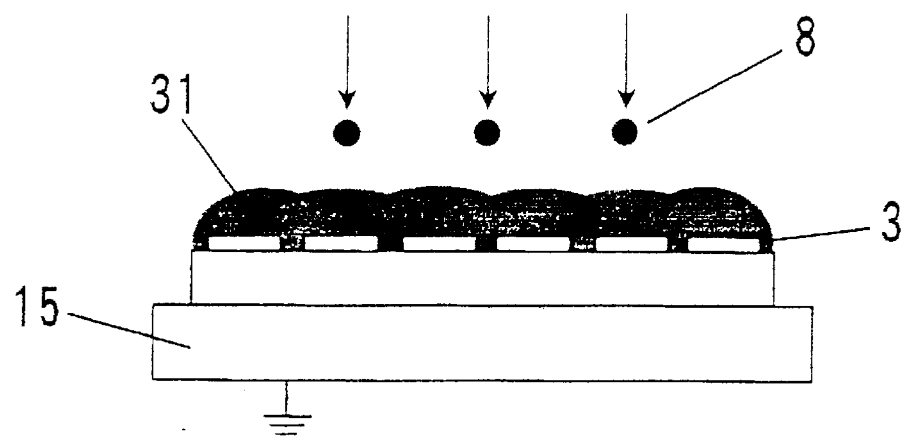
FIG. 16 is a schematic side view illustrating an equipotential surface on the substrate when the substrate surface is covered with moisture.

Furthermore, if the substrate surface is covered with moisture, the interelectrode gap resistance reduces even when the substrate side and the stage side are insulated from each other. Therefore, while, in a dry state, such an electric potential distribution as shown in FIG. 1 is attained, the electric potential distribution in the presence of moisture becomes one such as shown in FIG. 16, which is nearly uniform and reduces the selectivity of spacer disposition.

Even when spacers are sprayed under the same voltage application conditions and under the same spraying conditions, different states of spacer disposition will result since the moisture adhesion to the substrate varies according to the environmental humidity and temperature and so forth, leading to variations in the electric field to be utilized for spacer disposition.

Generally, the temperature and humidity in the process of LCD production are controlled to a certain extent. However, they are subject to seasonal fluctuations, for instance. The amount of adhering moisture changes also depending on the time from washing with water following rubbing to spraying or on the extent of drainage, for instance. Therefore, such changes in the amount of adhering moisture as resulting from the differences in environment, process step and so forth cause variations in spacer disposition state, hence variations in display performance of product liquid crystal display devices.

Further, even though the amount of adhering moisture can be maintained constantly at a certain level, it goes without saying that the smaller the moisture quantity on the substrate is, the easier the formation of an electric field suited for spacer disposition is. Therefore, by providing a step of removing moisture from the substrate onto which spacers are to be sprayed to thereby stably form an electric field suited for spacer disposition, it becomes possible to improve the selectivity of spacer positioning and stably produce liquid crystal display devices excellent in contrast and display uniformity.

The step of removing moisture from the substrate onto which spacers are to be sprayed can be carried out by heating the substrate prior to spraying. It may also be carried out by heating the substrate during spraying. Further, it may also be conducted by heating the substrate prior to spraying and heating it during spraying as well.

The substrate heating can be effected by means of an oven, hot plate or the like or by infrared heating, for instance, without any particular restriction provided that the substrate temperature can be increased. As the substrate temperature increases, the adhering moisture decreases, so that the substrate surface resistance increases; thus, no current leak occurs any more and stable and highly accurate spacer disposition becomes possible.

The heating temperature in the above substrate heating is preferably not lower than 50° C. If it is below 50° C., the moisture removing effect will be low. A heating temperature of 90° C. or above is more preferred. The effect of substrate heating varies depending on the heating temperature and time and, therefore, it is necessary to properly select the method of heating and the heating temperature according to the environmental humidity and the amount of adhering moisture.

When the time from heating to spacer spraying is too long, moisture may again adhere to the substrate after cooling in some instances, though such situation depends on the environmental humidity. Therefore, spacer spraying is preferably carried out immediately after heating.

However, a certain period of time is required for cooling, since when the substrate, while still hot, is disposed on the stage, the substrate may possibly become warped in the process of cooling in certain instances, leading to a worsened state of spacer disposition due to insufficient contact with the stage.

The above-mentioned substrate heating during spraying can be effected, for example, by maintaining the stage in a hot plate-like state or by disposing an infrared heating device within the spray chamber.

The above-mentioned step of removing moisture from the substrate onto which spacers are to be sprayed can also be carried out in the manner of air blowing by blowing a drying gas on the upper and lower surfaces of the substrate. The adhering moisture can be reduced by sufficiently blowing a drying gas on the upper and lower surfaces of the substrate. The drying gas is preferably in a dry state as close as possible to an absolute dry condition.

It is also preferred that the above drying gas be at a temperature not lower than room temperature. In the case of air blowing at a temperature below room temperature, the gas used, even when it is in a dry condition, deprives heat from the substrate, whereby the substrate temperature falls, whereupon moisture resulting from condensation may possibly adhere to the substrate.

Usable as the drying gas are dry nitrogen gas, dry air and the like.

The above step of removing moisture from the substrate onto which spacers are to be sprayed can also be carried out by replacing the moisture with a solvent. For example, the current leak to the stage can be reduced by wiping the back of the substrate and the peripheral region of the substrate with a solvent. The moisture can also be removed by dipping (immersing) the substrate in a solvent, followed by drying. Further, the drying time can be reduced and the tact time in the production process can be shortened by replacing the moisture with a solvent and then drying under heating. The solvent is not particularly restricted but one miscible with water and having a low boiling point, such as acetone, is preferred.

The above step of removing moisture from the substrate onto which spacers are to be sprayed can also be carried out by allowing the substrate to stand under vacuum or heating the same under vacuum. Thus, moisture removal can be effected by allowing the substrate under vacuum and more efficiently by heating the same under vacuum. For allowing the substrate under vacuum, a vacuum drier, for instance, can judiciously be used.

Figure 17:
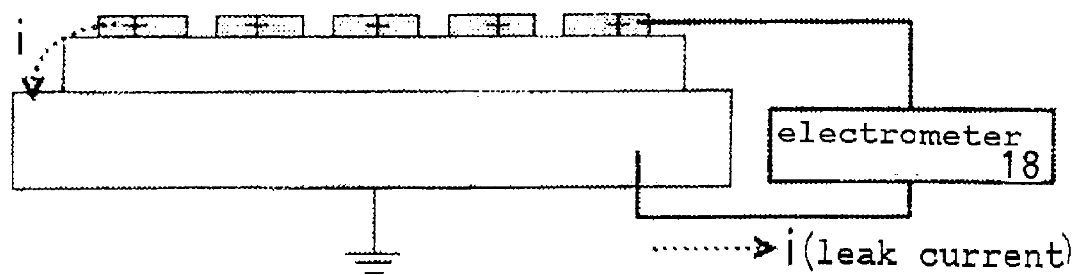
FIG. 17 is a schematic side view illustrating a leakage current detecting system which has an electrometer disposed between the transparent electrodes and the conductive stage and is to be used in the method for producing a liquid crystal display device according to an aspect of the present invention.

For confirming the moisture removal from the substrate in the above step, an electrometer or the like is provided between the transparent electrodes and the conductive stage, as shown in FIG. 17, and a preferred criterion for that purpose is that when a voltage of 1 kV is applied to the transparent electrodes after the above-mentioned step of moisture removal, the current flowing between the transparent electrodes and the conductive stage is not more than $10^{-6}$ A.

In providing the above-mentioned electrometer or the like, the electrodes for voltage application may be utilized or separate electrodes may be provided. The electrodes may have any shape, for example a needle-like shape or a flat sheet shape, and the electrode material maybe any conductive material. For example, contact probes for testing purposes may be used as the electrodes.

It is necessary that the above electrodes be provided so as not to become obstacles in inserting the substrate into the sprayer. This insertion of the substrate into the sprayer can be facilitated, for example, by providing a mechanism enabling an up-and-down motion of the substrate or the electrodes.

In cases where the substrate surface has adhering moisture, a microcurrent flows upon application of a voltage to the transparent electrodes as mentioned above, hence no electric field suited for spacer disposition is formed any longer. Therefore, if the current flowing between the transparent electrodes and the conductive stage on application of a voltage of 1 kV to the electrodes is greater than $10^{-6}$ A, an electric field suited for spacer disposition is hardly produced, hence the selectivity of spacer disposition tends to decrease. When the current is not greater than $10^{-6}$ A, an electric field favorable for spacer positioning is formed and the spacers show highly selective positioning.

As mentioned above, if when a voltage of 1 kV is applied to the transparent electrodes, the current flowing between the transparent electrodes and the conductive stage is greater than $10^{-6}$ A, an electric field favorable for spacer disposition is hardly produced, hence the selectivity of spacer disposition may reduce. It is possible, however, to employ substrate voltage measurements in lieu of the electrometer by utilizing the fact that a higher current leads to a reduction in transparent electrode voltage due to voltage drop. In this case, a voltmeter having a sufficiently high input resistance is disposed in the same manner as the electrometer for confirming that the measured value obtained by the voltmeter be equal to the applied voltage within the precision or error of measurement.

It is to be noted that, in spacer disposition, it is not necessary to apply a voltage of 1 kV to the transparent electrodes. That the current flowing between the transparent electrodes and the conductive stage is not more than $10^{-6}$ A serves only as a criterion for confirming that moisture has been removed.

In carrying out the method of LCD production comprising disposing spacers at black matrix sites while applying a voltage of the same polarity as the spacer charge polarity to the transparent electrodes, it was a problem that even when the same conditions and same substrate species are used, the percentage of spacer disposition at black matrix sites is always variable and depends on the time and situation. As a result of an intensive investigation of the cause thereof, it was found that the selectivity of spacer positioning at black matrix sites varies under the influence of the moisture in the environment (air). Therefore, by providing a step of removing moisture from the substrate onto which spacers are to be sprayed, it becomes possible to improve the insulation performance, eliminate the leakage current from the transparent electrodes and stably form an electric field for spacer positioning. As a result, it becomes possible to dispose spacers at black matrix sites with good yield and high precision.

The method of LCD production according to the fifth aspect of the present invention comprising spraying spacers onto at least one of a first substrate comprising at least pattern-forming transparent electrodes and an alignment layer and a second substrate to be disposed opposingly above the first substrate and filling a liquid crystal into the space between both the substrates comprises the step of disposing the substrate in close contact with an earthed conductive stage and spraying spacers while applying a voltage of the same polarity as the spacer charge polarity to the transparent electrodes on the substrate, wherein the substrate before and during spacer spraying shows characteristics such that when a voltage of 1 kV is applied to the transparent electrodes on the substrate, the current flowing between the transparent electrodes on the substrate and the conductive stage is not more than $10^{-6}$ A.

The transparent electrodes, substrates, spacers and spacer charging method mentioned above are the same as mentioned hereinabove referring to the first aspect of the invention. As explained in relation to the first aspect of the invention, the method of LCD production according to the fifth aspect of the invention can be applied to the production of TFT type liquid crystal display devices.

As explained in relation to the fourth aspect of the invention, the adhesion of moisture to the substrate varies depending on the environmental humidity and temperature, among others. Therefore, even when spacers are sprayed under the same voltage application conditions and the same spraying conditions, the electric field to be utilized in spacer disposition varies, hence different states of spacer disposition result.

Therefore, by disposing the substrate in close contact with an earthed conductive stage and spraying spacers in inter-electrode gaps with high accuracy and in a stable manner by applying a voltage of the same polarity as the spacer charge polarity to the substrate electrodes, it is necessary to check and control the moisture on the substrate.

As mentioned hereinbefore, the moisture condition on the substrate can be checked, for example, by providing an electrometer or the like between the transparent electrodes and the conductive stage, as shown in FIG. 17.

The method of checking by providing an electrometer or the like in the above manner comprises applying a voltage to the transparent electrodes on the substrate onto which spacers are to be sprayed and measuring the current flowing between the transparent electrodes and the conductive stage. On that occasion, if the substrate is in a moistened state under the influence of the humidity and so forth, the leakage current flowing from the transparent electrodes to the stage will be strong and, if the substrate is in a dry state, the leakage current will be weak.

Therefore, for checking the amount of moisture adhering to the substrate before spraying as well as during spraying, a voltage of 1 kV is applied to the transparent electrodes and the current flowing between the transparent electrodes and the conductive stage is checked by means of an electrometer or the like. When the microcurrent flowing between the transparent electrodes and the conductive stage is controlled by restricting the current to not more than $10^{-6}$ A, the spacer positioning is stabilized.

It is not necessary that the voltage to be applied to the transparent electrodes for spacer disposition be equal to 1 kV. The sole purpose of using a voltage of 1 kV is to check the moisture content by confirming that, at this voltage, a current not greater than $10^{-6}$ A will flow between the transparent electrodes and the conductive stage.

The above method of LCD production is preferably carried out by controlling, in the step of disposing the substrate in close contact with an earthed conductive stage and spraying spacers while applying a voltage of the same polarity as the spacer charge polarity to the transparent electrodes on the substrate, the temperature and relative humidity within the ranges of room temperature (18° C. to 28° C.) and not more than 50%, respectively, so that the current flowing between the transparent electrodes and the conductive stage may be restricted to not more than $10^{-6}$ A.

Furthermore, in storing the above substrate, for instance, the substrate is preferably kept in an environment at room temperature (18° C. to 28° C.) and at a relative humidity of not more than 50%.

When the relative humidity is not more than 50% but the temperature is lower than room temperature (18° C.), the temperature is excessively lower than the working environment and may rather cause condensation of the moisture. When the relative humidity is not more than 50% but the temperature is higher than room temperature (28° C.), the environment is unsuitable as the working environment. Further, when the relative humidity is higher than 50%, the moisture in the air is excessive, causing constant adherence of moisture to the substrate and making it difficult to realize high precision spacer disposition.

In carrying out the method of LCD production comprising disposing spacers at black matrix sites by applying a voltage of the same polarity as the spacer charge polarity to the transparent electrodes, it becomes possible to dispose spacers at black matrix sites in a high yield and with high accuracy when the moisture on the substrate onto which spacers are to be sprayed is controlled to thereby cause stable formation of an electric field for spacer disposition.

The method of LCD production according to the sixth aspect of the present invention comprising spraying spacers onto at least one of a first substrate comprising at least pattern-forming transparent electrodes and an alignment layer and a second substrate to be disposed opposingly above the first substrate and filling a liquid crystal into the space between both the substrates comprises disposing, in spraying positively or negatively charged spacers onto the substrate, the substrate into close contact with an earthed conductive stage, applying a voltage of the same polarity as the spacer charge polarity to the transparent electrodes on the substrate, then removing, from the transparent electrodes, the terminals of the voltage application apparatus, and carrying out spacer spraying while the electric charge remains on the substrate.

The transparent electrodes, substrates, spacers and spacer charging method mentioned above are the same as mentioned hereinabove referring to the first aspect of the invention. As explained in relation to the first aspect of the invention, the method of LCD production according to the sixth aspect of the invention can be applied to the production of TFT type liquid crystal display devices.

As explained in relation to the third aspect of the invention, in spraying charged spacers in the production of STN type liquid crystal display devices, for instance, the spacers can be disposed in the gaps between the respective two transparent electrodes by means of a repulsive force by disposing the substrate comprising at least pattern-forming transparent electrodes and an alignment layer in close contact with an earthed conductive stage and applying a voltage of the same polarity as the spacer charge polarity to the transparent electrodes on the substrate. In this case, an electric field suited for spacer disposition can be formed by bringing the substrate in close contact with the earthed conductive stage, as shown in FIG. 1.

The above stage is required to have a volume resistance of not more than $10^{10}$ Ωcm and the above substrate may be in close contact with the stage at least over a certain proportion of the surface area thereof. If the volume resistance is higher than the above value, the whole substrate will have an electric potential close to that of the transparent electrodes and, as a result, the positioning accuracy will become deteriorated.

Figure 18:
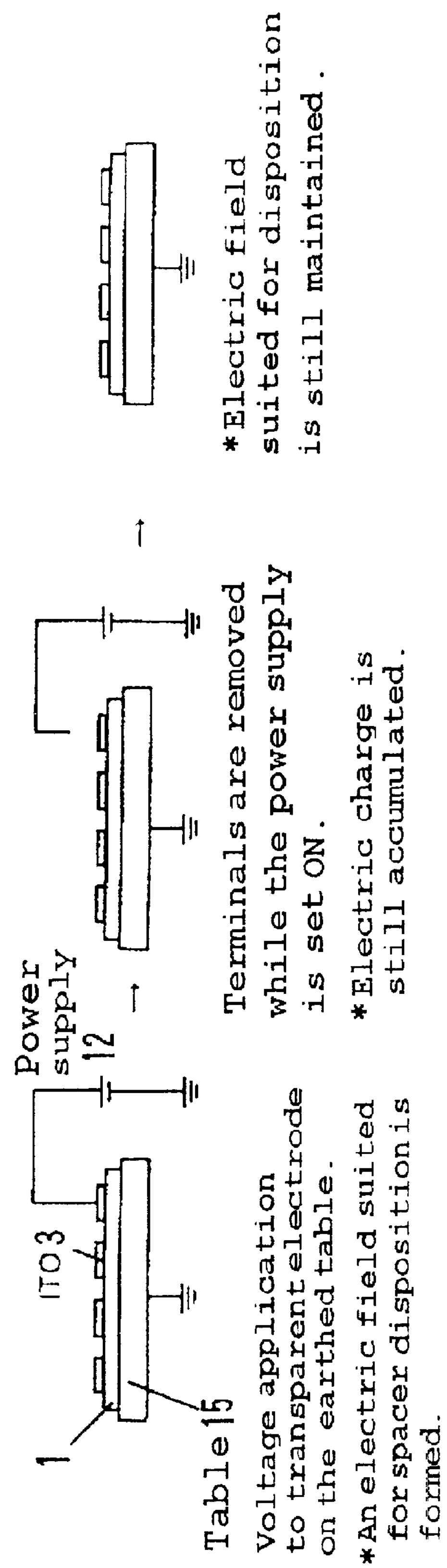
FIG. 18 is a schematic side view illustrating how an electric field suited for spacer spraying is maintained by disposing a substrate in close contact with an earthed conductive stage (table), applying a voltage of the same polarity as the spacer charge polarity to the pattern-forming transparent electrodes formed on the substrate onto which spacers are to be sprayed, and then removing, from the transparent electrodes, the terminals from the voltage application apparatus while applying the voltage of the same polarity as the spacer charge polarity to the pattern-forming transparent electrodes.

Here, when the substrate is disposed in close contact with the earthed conductive stage and a voltage of the same polarity as the spacer charge polarity is applied to the pattern-forming transparent electrodes on the substrate onto which spacers are to be sprayed, as shown in FIG. 18, an electric field suited for spacer disposition is formed. Then, the terminals of a voltage application apparatus are removed from the transparent electrodes, whereupon an electric charge is accumulated on each transparent electrode and the charge remains for a certain period of time.

Thus, an electric field suited for spacer disposition is maintained for a certain period of time. When spacers are sprayed in that state, the spacers can be disposed between the respective neighboring transparent electrodes.

On that occasion, it is necessary to remove the terminals from the voltage application apparatus from the transparent electrodes while applying a voltage of the same polarity as the spacer charge polarity to the pattern-forming transparent electrodes. If the voltage application is discontinued without removing the terminals, the electric charge will flow out via the voltage application apparatus and, as a result, any electric field suited for spacer disposition will not be obtained any longer.

The above conductive stage (also referred to as table), which moves together with the substrate, may be a plate-like one or a film- or sheet-like one, such as an aluminum foil, provided that it is earthed at the time of voltage application.

The application of a voltage of the same polarity as the spacer charge polarity to the pattern-forming transparent electrodes is preferably carried out over a certain period of time. A longer period of voltage application results in an increased electric charge accumulation, hence in a prolonged duration of the effect after removal of the terminals derived from the voltage application apparatus.

When spacer spraying is carried out while applying a voltage of 2.0 kV, for instance, and the disposition at that voltage is confirmed to be appropriate, it is preferred that a little higher voltage, for example 2.5 kV, be applied in employing the method according to the seventh aspect of the present invention.

This is because, since the electric charge attenuates with the lapse of time, it is necessary to take the attenuation into consideration.

Further, the earthed conductive stage is a mobile one. Thus, by setting the substrate in close contact with the earthed conductive stage, applying a voltage of the same polarity as the positively or negatively charged spacer to the transparent electrodes on the substrate, disconnecting the terminals of a voltage application apparatus from the transparent electrodes, causing the conductive stage and substrate held in intimate contact to move into the sprayer, and applying a voltage on the earthed conductive stage, an electric field suited for spacer disposition can be formed to thereby dispose the spacers into the gaps between the transparent electrodes.

Upon removal of the terminals derived from the voltage application apparatus while still applying a voltage of the same polarity as the spacer charge polarity to the transparent electrodes on the substrate, an electric charge remains on the substrate and an electric field suited for spacer disposition is maintained. Here, as long as the substrate and the conductive stage are kept in close contact, the electric field formed is maintained for insuring adequate spacer positioning, whether the "table plus substrate" is positioned after movement in an earthed site or in an insulated site.

Figure 19:
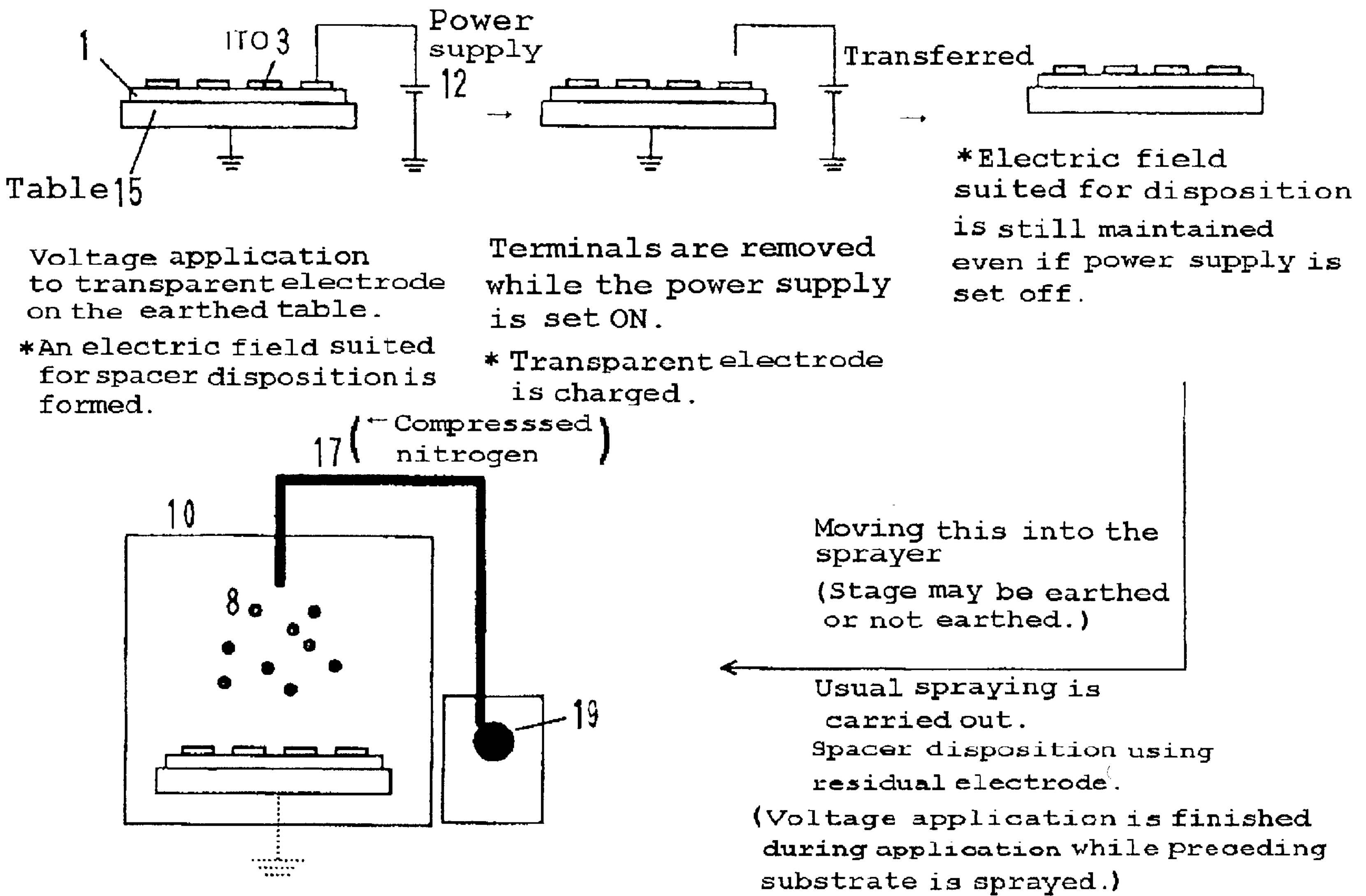
FIG. 19 is a schematic side view illustrating how the step of voltage application within a spray apparatus can be omitted and the tact time reduced by applying a voltage to the transparent electrodes on an earthed conductive stage prior to the step of spacer spraying and causing them to pass through the spray apparatus together with the conductive stage (table)

Therefore, as shown in FIG. 19, the step of voltage application within the sprayer can be omitted and the tact time curtailed by applying a voltage to the transparent electrodes on the earthed conductive stage before the step of spacer spraying and feeding the table together with the transparent electrodes into the sprayer. In other words, the step of voltage application to the next substrate onto which spacers are to be sprayed can be finished during spacer spraying onto the preceding substrate within the sprayer and thus high contrast liquid crystal display devices free of spacers in the display portions can be produced with a high degree of efficiency.

The method of LCD production according to the seventh aspect of the present invention comprising spraying spacers onto at least one of a first substrate comprising at least pattern-forming transparent electrode and an alignment layer and a second substrate to be disposed opposingly above the first substrate and filling a liquid crystal into the space between both the substrates comprises disposing, in spraying positively or negatively charged spacers onto the substrate, the substrate into close contact with an earthed conductive stage, applying a voltage of the same polarity as the spacer charge polarity to the transparent electrodes on the substrate, maintaining that state of voltage application for a certain period of time and then carrying out spacer spraying while maintaining that state of voltage application.

The transparent electrodes, substrates, spacers and spacer charging method mentioned above are the same as mentioned hereinabove referring to the first aspect of the invention. As explained in relation to the first aspect of the invention, the method of LCD production according to the seventh aspect of the invention can be applied to the production of TFT type liquid crystal display devices.

As explained in relation to the third aspect of the invention, in spraying charged spacers in the production of STN type liquid crystal display devices, for instance, the spacers can be disposed in the gaps between the respective two transparent electrodes by means of a repulsive force by disposing the substrate comprising at least pattern-forming transparent electrodes and an alignment layer in close contact with an earthed conductive stage and applying a voltage of the same polarity as the spacer charge polarity to the transparent electrodes on the substrate. In this case, an electric field suited for spacer disposition can be formed by bringing the substrate in close contact with the earthed conductive stage, as shown in FIG. 1.

The above stage is required to have a volume resistance of not more than $10^{10}$ Ωcm and the above substrate may be in close contact with the stage at least over a certain proportion of the surface area thereof. If the volume resistance is higher than the above value, the whole substrate will have an electric potential close to that of the transparent electrodes and, as a result, the positioning accuracy will become deteriorated.

Upon voltage application to the transparent electrodes on the substrate in a state such that the substrate is disposed on the earthed conductive stage, the substrate is electrostatically brought into close contact with the conductive stage.

In that case, it is presumable that, at the moment of voltage application, an air layer occurs between the substrate and the conductive stage, hence no perfectly close contact has been attained as yet.

Here, an electric field suited for spacer disposition is formed by the substrate coming into close contact with the conductive stage. Therefore, when an air layer, which is an insulating layer, occurs between the substrate and the conductive stage, the electric potential between the respective neighboring transparent electrodes will not decrease to a sufficient extent, hence the spacer positioning accuracy tends to deteriorate.

During voltage application to the transparent electrodes, the conductive stage and the substrate are electrostatically attracted to each other. This electrostatic force gradually eliminates the air and a state of highly close contact is attained between the conductive stage and the substrate, and an electric field suited for spacer disposition is formed stably.

In that case, the state of voltage application is preferably maintained for at least five seconds since, in this case, the air is sufficiently eliminated from between the conductive stage and the substrate, with the result that a stably high level of spacer positioning accuracy can be secured.

The method of LCD production according to the eighth aspect of the present invention comprising spraying spacers onto a first substrate comprising at least pattern-forming transparent electrodes, a conductive black matrix, an overcoat layer and an alignment layer, and filling a liquid crystal into the space between the first substrate and a second substrate comprising thin film transistors formed thereon, which is to be disposed opposingly above the first substrate comprises using, as the first substrate, a substrate having transparent electrode-free etched regions formed within the transparent electrodes over and within the expanse of the corresponding conductive black matrix areas, and, in spraying positively or negatively charged spacers onto the first substrate, applying a voltage (V1) to the conductive black matrix and a voltage (V2) to the transparent electrodes, wherein both the voltages V1 and V2 are positive ones and satisfying the relation V1<V2 when the spacer charge polarity is positive, or both V1 and V2 are negative voltages and satisfying the relation V1>V2, when the spacer charge polarity is negative.

The transparent electrodes, substrates, spacers and spacer charging method mentioned above are the same as mentioned hereinabove referring to the first aspect of the invention.

The above conductive black matrix and overcoat layer are the same as mentioned hereinabove referring to the second aspect of the invention.

Figure 20:
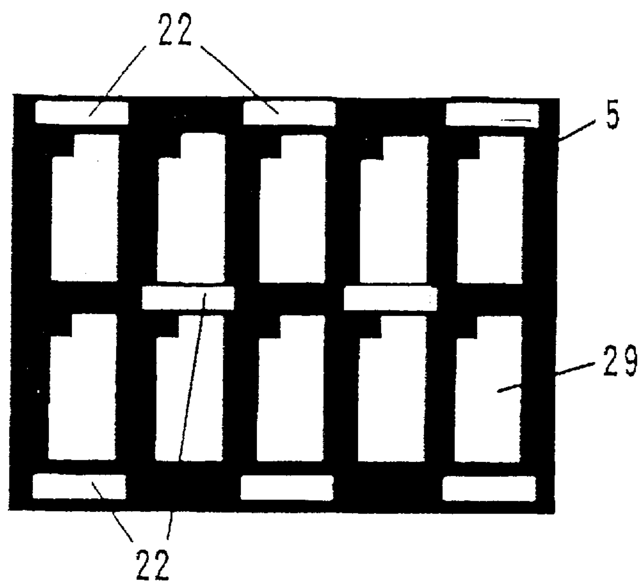
FIG. 20 is a schematic plan view illustrating an embodiment of the first substrate of the present invention, with etched areas formed thereon.
Figure 21:
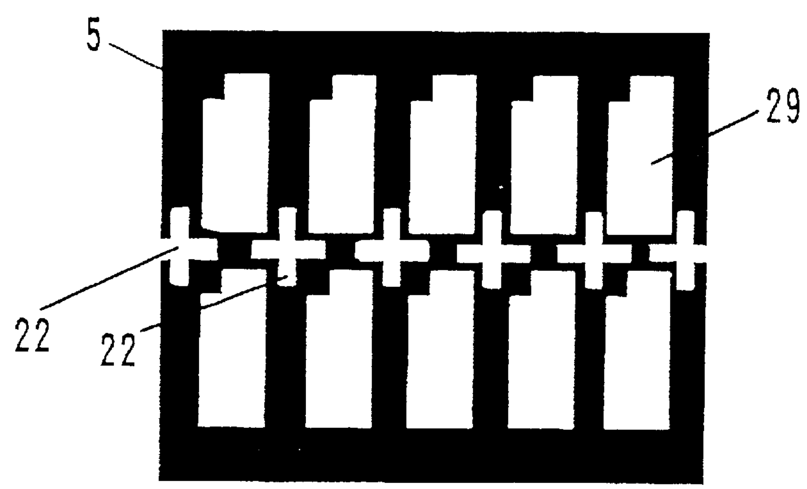
FIG. 21 is a schematic plan view illustrating another embodiment of the first substrate of the present invention, with etched areas formed thereon.
Figure 22:
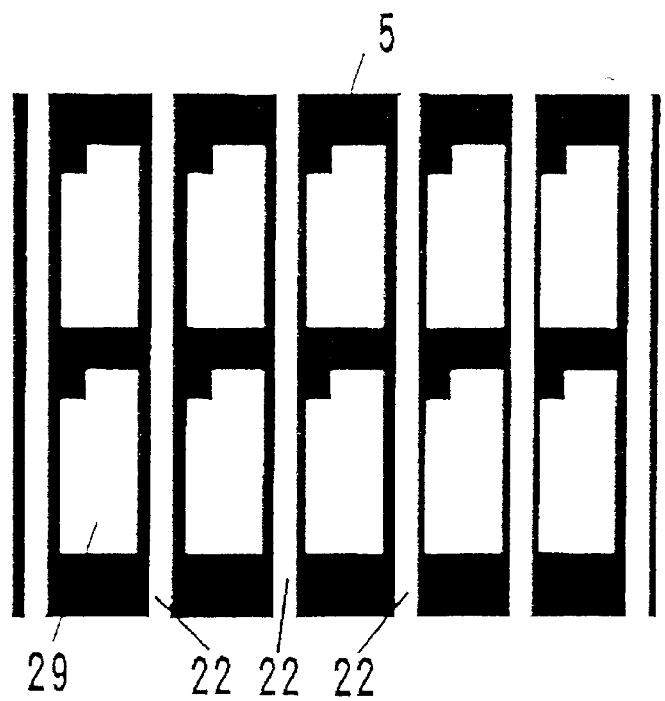
FIG. 22 is a schematic plan view illustrating a further embodiment of the first substrate of the present invention, with etched areas formed thereon.

On the above-mentioned first substrate, there are formed, within each transparent electrode, transparent electrode-free etched regions over and within the expanse of the corresponding conductive black matrix areas, as shown in FIG. 20.

FIGS. 20 to 23 each is a schematic view illustrating a first substrate with such etched areas formed thereon.

These etched areas, as shown in FIGS. 20 to 23, are formed by performing etching the transparent electrodes in a predetermined pattern over and within the expanse of the corresponding conductive black matrix areas.

The etched areas may be over and within the expanse of the corresponding linear conductive black matrix portions arranged in the horizontal direction or the direction perpendicular thereto, or over and within the expanses of the crossing portions of the black matrix, for instance. They are not restricted in shape but may be linear, rectangular (FIGS. 20 and 23), circular, cross-shaped (FIG. 21) or stripe-like (FIG. 22), for instance. The frequency of appearance of etched areas is not particularly restricted, either. Thus, they may each appear per dot pitch, per pixel pitch and/or per several pixels, in the horizontal and/or vertical direction.

In TFT type liquid crystal display devices, a first substrate having color filters is generally used as a common electrode and the transparent electrodes are formed as a solid electrode. In the first substrate, a voltage is applied to the solid electrode, and the voltage control of the respective pixels is carried out by using thin film transistors and transparent electrodes formed on a second substrate.

Therefore, even when etched areas are formed on the solid electrode by etching, a voltage is applied to the display areas quite in the conventional manner in the liquid crystal display device assembled, hence no adverse influence is exerted on the display performance.

In accordance with the eighth aspect of the invention, in spraying positively or negatively charged spacers onto the first substrate, a voltage (V1) is applied to the black matrix and a voltage (V2) to the transparent electrodes.

As for the voltage species, the same explanation as made referring to the first aspect of the invention applies.

By applying a voltage (V1) to the conductive black matrix and a voltage (V2) to the transparent electrodes, it is possible to form an electric field suited for spacer disposition, as shown in FIG. 2, like the case shown in FIG. 1, without requiring disposing the substrate in close contact with a conductive stage having a volume resistance of not more than $10^{10}$ Ωcm.

When the spacer charge is positive, for instance, positive voltages are used as both voltages to be applied, with the condition V1<V2, whereby a stronger repulsive force is produced over the transparent electrodes and a weaker repulsive force over the black matrix sites, so that spacers can be disposed at black matrix sites (in the case of negative spacer charge as well, the situation is the same).

The reason why the above V1 and V2 and the spacer charge should have the same polarity is as follows. For controlling the spacer falling positions with high accuracy, a repulsive force of around 1 kV is required. If, here, V1 and V2 are different in polarity, the potential difference between the transparent electrodes and the black matrix becomes about 1 kV. Since the overcoat layer is as thin as 2 to 5 μm, short-circuiting occurs between the transparent electrodes and the black matrix and, thus, any electric field suited for spacer positioning is no longer formed. Therefore, the potential difference between V1 and V2 is preferably within 100 V. Spacer position control can be accomplished with success even when the potential difference is thus small, namely not more than 100 V, for this is a potential difference in the repulsive phase.

As for the relation between V1 and V2, the same explanation. as made referring to the second aspect of the invention applies.

The method of LCD production according to the ninth aspect of the present invention comprising spraying spacers onto a first substrate comprising at least pattern-forming transparent electrodes, a black matrix, an overcoat layer and an alignment layer, and filling a liquid crystal into the space between the first substrate and a second substrate comprising thin film transistors formed thereon, which is to be disposed opposingly above the first substrate, comprises using, as the first substrate, a substrate having transparent electrode-free etched regions formed within the transparent electrodes over and within the expanse of the corresponding conductive black matrix areas, and, in spraying positively or negatively charged spacers onto the first substrate, disposing the first substrate into close contact with an earthed conductive stage having a volume resistance of not more than $10^{10}$ Ωcm and applying, to the transparent electrodes, a voltage of 200 V to 5 kV having the same polarity as the spacer charge polarity.

The transparent electrodes, substrates, spacers and spacer charging method mentioned above are the same as mentioned hereinabove referring to the first aspect of the invention. The overcoat layer is the same as mentioned hereinabove referring to the second aspect of the invention.

By disposing the substrate in close contact with the earthed conductive stage, which has a volume resistance of not more than $10^{10}$ Ωcm, the electric potential between the respective transparent electrodes lowers, as shown in FIG. 2, and an electric field suited for spacer disposition is formed in the same manner as shown in FIG. 1, with the result that spacers are disposed in etched areas (interline areas).

The voltage to be applied to the above transparent electrodes is 200 V to 5 kV. At a voltage below 200 V, a potential difference sufficient for achieving spacer position control may not be produced. At a voltage exceeding 5 kV, short-circuiting may readily occur between the transparent electrodes and the conductive black matrix.

As for the voltage species, the same explanation as made referring to the first aspect of the invention applies.

In spraying charged spacers according to the ninth aspect of the invention, the electric field formed over the transparent electrodes exerts a repulsive force against the charge polarity of spacers, so that those spacers sprayed over the periphery of the first substrate can readily escape outside. Thus, the number of spacers disposed on the periphery of the first substrate tends to decrease.

Generally, transparent electrodes are formed only in the display area of the first substrate. In the eighth and ninth aspects of the invention, however, it is preferred that transparent electrodes be formed outside the display area as well and that the same voltage as that in the display area be applied thereto. By doing so, the decrease in number of spacers occurs only outside the display area and spacers are disposed uniformly within the display area.

The method of LCD production according to the tenth aspect of the present invention comprising spraying spacers onto a first substrate comprising at least pattern-forming transparent electrodes, and filling a liquid crystal into the space between the first substrate and a second substrate comprising thin film transistors formed thereon, which is to be disposed opposingly above the first substrate, comprises using, as the first substrate, a substrate having isolated, electrically floating, transparent electrodes not connected with the surrounding transparent electrodes but formed within the transparent electrodes within the expanse of the corresponding black matrix areas as formed on the first or second substrate, and, in spraying positively or negatively charged spacers onto the first substrate, disposing the first substrate into close contact with an earthed conductive stage having a volume resistance of not more than $10^{10}$ Ωcm and applying a voltage of the same polarity as the spacer charge polarity to the transparent electrodes other than the isolated transparent electrodes on the first substrate.

In the first substrate for constituting a TFT type liquid crystal display device, it is a general practice to form a color filter layer on a glass substrate and a black matrix, then form an overcoat layer of an insulating material on the color filter layer and further form thereon transparent electrodes and an alignment layer (not shown), as shown in FIG. 2. In the description that follows, the first substrate is to be construed as having the above constitution.

The transparent electrodes, substrates, spacers and spacer charging method mentioned above are the same as mentioned hereinabove referring to the first aspect of the invention. The black matrix is not particularly restricted on condition that it has a light blocking effect. It may be made of chromium, aluminum, carbon black or a pigment, for instance.

The overcoat layer is the same as that mentioned hereinabove referring to the second aspect of the invention.

Figure 24:
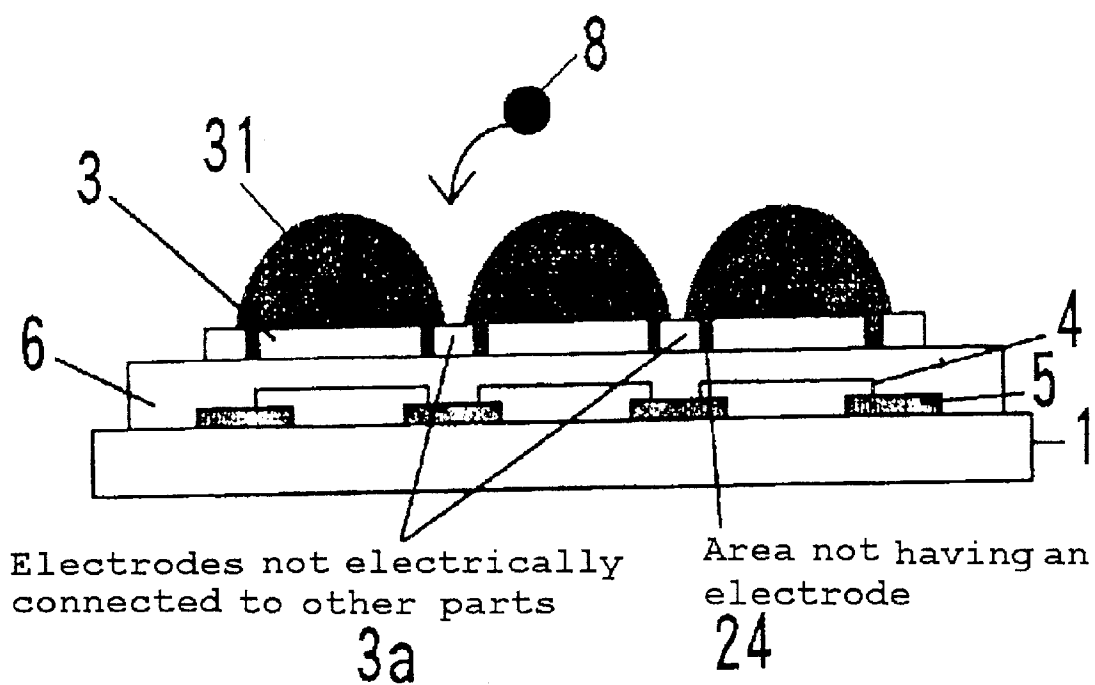
FIG. 24 is a schematic sectional view illustrating the method for producing a liquid crystal display device according to an aspect of the present invention.
Figure 25:
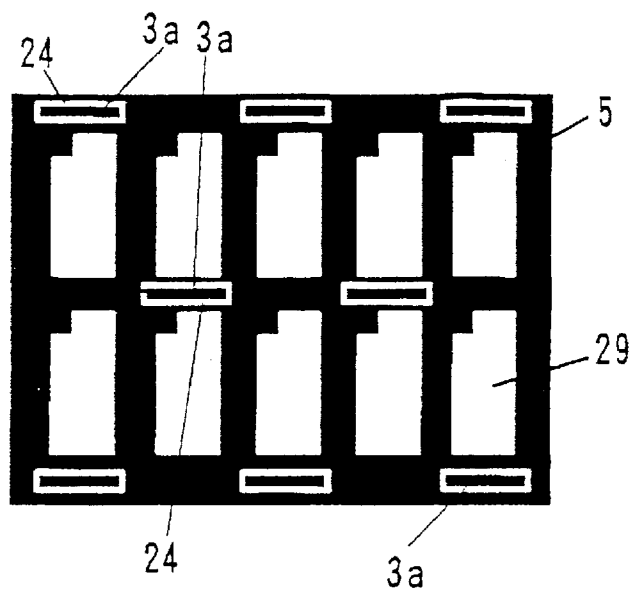
FIG. 25 is a schematic plan view illustrating an embodiment of the first substrate of the present invention, with isolated transparent electrodes formed thereon.
Figure 26:
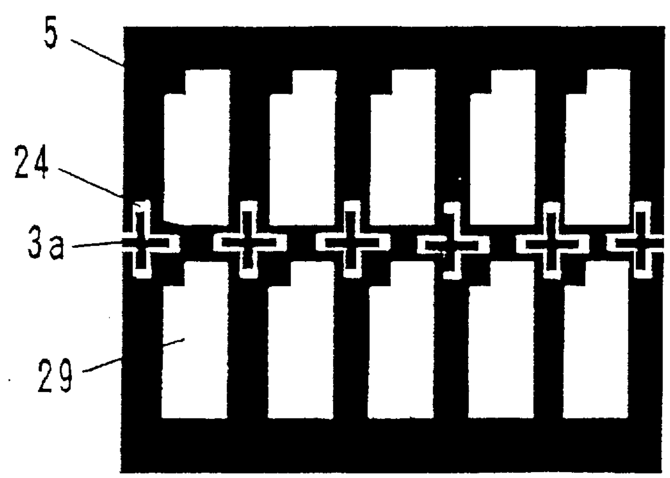
FIG. 26 is a schematic plan view illustrating another embodiment of the first substrate of the present invention, with isolated transparent electrodes formed thereon.
Figure 27:
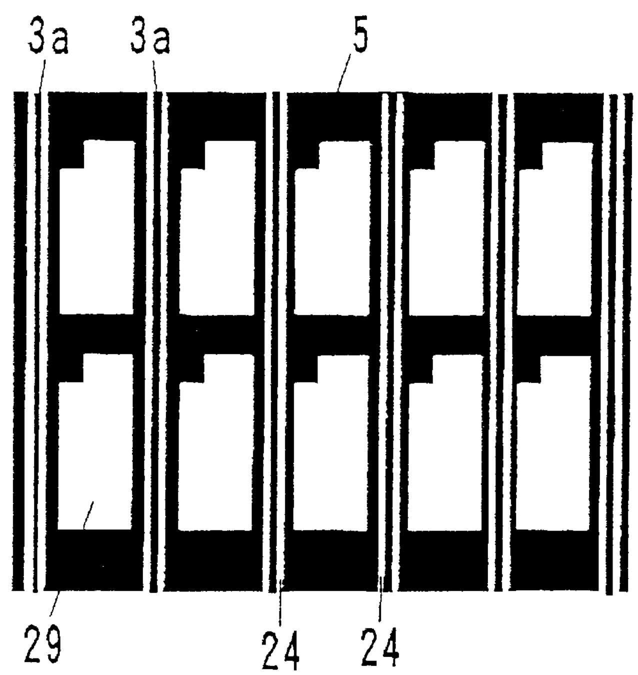
FIG. 27 is a schematic plan view illustrating a further embodiment of the first substrate of the present invention, with isolated transparent electrodes formed thereon.

Within the transparent electrodes on the above first substrate, there are formed isolated, electrically floating, transparent electrodes not connected with the surrounding electrodes in a manner such that they are located within the expanse of the corresponding black matrix-forming areas, as shown in FIG. 24.

FIGS. 25 to 28 each is a schematic view illustrating the first substrate having such isolated transparent electrodes formed thereon.

As shown in FIGS. 25 to 28, these isolated transparent electrodes are formed by etching in a predetermined width around the contemplated transparent electrode areas. Each etched zone thus formed by etching preferably has a width (distance between the corresponding transparent electrode and the isolated transparent electrode) of not less than 3 $\mu$m, more preferably not less than 5 $\mu$m. If the etched zone width is less than 3 $\mu$m, short-circuiting may readily occur between the corresponding transparent electrode and the isolated transparent electrode.

The sites at which isolated transparent electrodes are formed may be within the expanse of the corresponding linear black matrix-forming regions arranged in the horizontal direction or the direction perpendicular thereto, or within the expanse of the corresponding black matrix-forming crossing portions, for instance. They are not restricted in shape but may be linear, rectangular (FIGS. 25 and 28), circular, cross-shaped (FIG. 26) or stripe-like (FIG. 27), for instance. The frequency of appearance of the isolated transparent electrodes is not particularly restricted, either. Thus, they may each appear per dot pitch, per pixel pitch and/or per several pixels, in the horizontal and/or vertical direction.

In the TFT type liquid crystal display device according to the tenth aspect of the invention, like in the one described referring to the eighth aspect of the invention, even when isolated transparent electrodes are formed within a solid electrode by etching, a voltage is applied to the display area of the liquid crystal display device assembled in the same manner as in the prior art and no adverse effect is produced on the display performance.

The first substrate having transparent electrodes and isolated transparent electrodes in the above mode is brought into close contact with an earthed conductive stage having a volume resistance of not more than $10^{10}$ Ωcm and spacer spraying is carried out while applying a voltage of the same polarity as the spacer charge polarity to other transparent electrodes than the isolated transparent electrodes on the first substrate.

By disposing the substrate in close contact with the earthed conductive stage having a volume resistance of not more than $10^{10}$ Ωcm, the electric potential of the gaps between the respective transparent electrodes lowers, as shown in FIG. 24, and an electric field suited for spacer positioning is formed, in the same manner as shown in FIG. 1, and spacers are disposed on the isolated transparent electrodes.

The voltage required for spacer disposition is preferably about 200 V to 5 kV, although it depends on the spacer diameter and/or the charge thereon. At a voltage exceeding 5 kV, when the black matrix is conductive, short-circuiting may readily occur between the transparent electrodes and the conductive black matrix and even between the transparent electrodes and the isolated transparent electrodes, leading to a reduced yield. At below 200 V, spacers falling down in the step of spraying will arrive at the substrate surface before their making a necessary turn, hence the spacer positioning accuracy may be decreased.

The amount of electric charge on the spacer may be the same as mentioned referring to the second aspect of the invention.

In spraying charged spacers, the electric charge formed over the transparent electrodes acts as a repulsive force against the spacer charge polarity, so that those spacers sprayed over the periphery of the first substrate can readily escape outside the same. Therefore, the number of spacers disposed on the periphery of the first substrate shows a tendency to decrease.

While, generally, transparent electrodes are formed only in the display area, it is preferred, in the practice of the tenth aspect of the invention, that transparent electrodes be formed outside the display area as well and that the same voltage as that applied to the display area be applied to the transparent electrodes outside the display area. In this arrangement, the decrease in the number of spacers occurs only outside the display area and spacers are disposed uniformly within the display area.

The method of LCD production according to the eleventh aspect of the invention, which is as defined in the first, second, third, fourth, fifth, sixth, seventh, eighth, ninth or tenth aspect of the invention, comprises charging spacers positively or negatively by spraying them through a pipeline made of a resin or a metal using a gas as a medium, whereby the amount of charge on each spacer to be sprayed is increased as compared with the wet method of spraying and the precision of spacer positioning on the substrate is improved.

The method of LCD production according to the twelfth aspect of the invention, which is as defined in the first, second, third, fourth, fifth, sixth, seventh, eighth, ninth, tenth or eleventh aspect of the invention, comprises fixing spacers on the substrate surface by heating.

By using spacers exhibiting adhesiveness upon heating, for instance, and fixing them on the substrate surface, it is possible to prevent spacers from moving after disposition and thus produce a high quality liquid crystal display device uniform in cell thickness and free of display unevenness.

As the method of causing spacers to express adhesiveness upon heating, there may be mentioned, among others, the method comprising covering spacers with a thermoplastic resin layer and the method comprising introducing a reactive group onto the spacer surface. It is also possible to cause spacers to show adhesiveness upon light irradiation by some or other means.

The liquid crystal display device according to the thirteenth aspect of the invention is one produced by the method of LCD production according to the first, second, third, fourth, fifth, sixth, seventh, eighth, ninth, tenth, eleventh or twelfth aspect of the invention. It is uniform in cell thickness and has high quality display performance characteristics without showing any unevenness in display.

BEST MODES FOR CARRYING OUT THE INVENTION

The following examples illustrate the present invention in further detail. They are, however, by no means limitative of the scope of the invention.

EXAMPLE 1

A segment electrode substrate for STN type LCD production (360×460 mm glass substrate with pattern-forming linear transparent electrodes formed thereon; ITO (indium tin oxide) electrode width 80 μm, interelectrode gap 20 μm, glass thickness 0.7 mm) was prepared as the substrate.

On this substrate was formed a 0.05-μm-thick polyimide alignment layer, which was subjected to rubbing treatment.

The substrate was of a type for producing two final substrates, namely it had two display areas formed thereon. All linear transparent electrodes (ITO electrodes) were connected with one another outside the display areas and connected with a voltage application apparatus so that a direct current voltage might be applied to the ITO electrodes on the substrate. The voltage application apparatus could arbitrarily be adjusted with respect to voltage and voltage polarity.

Figure 29:
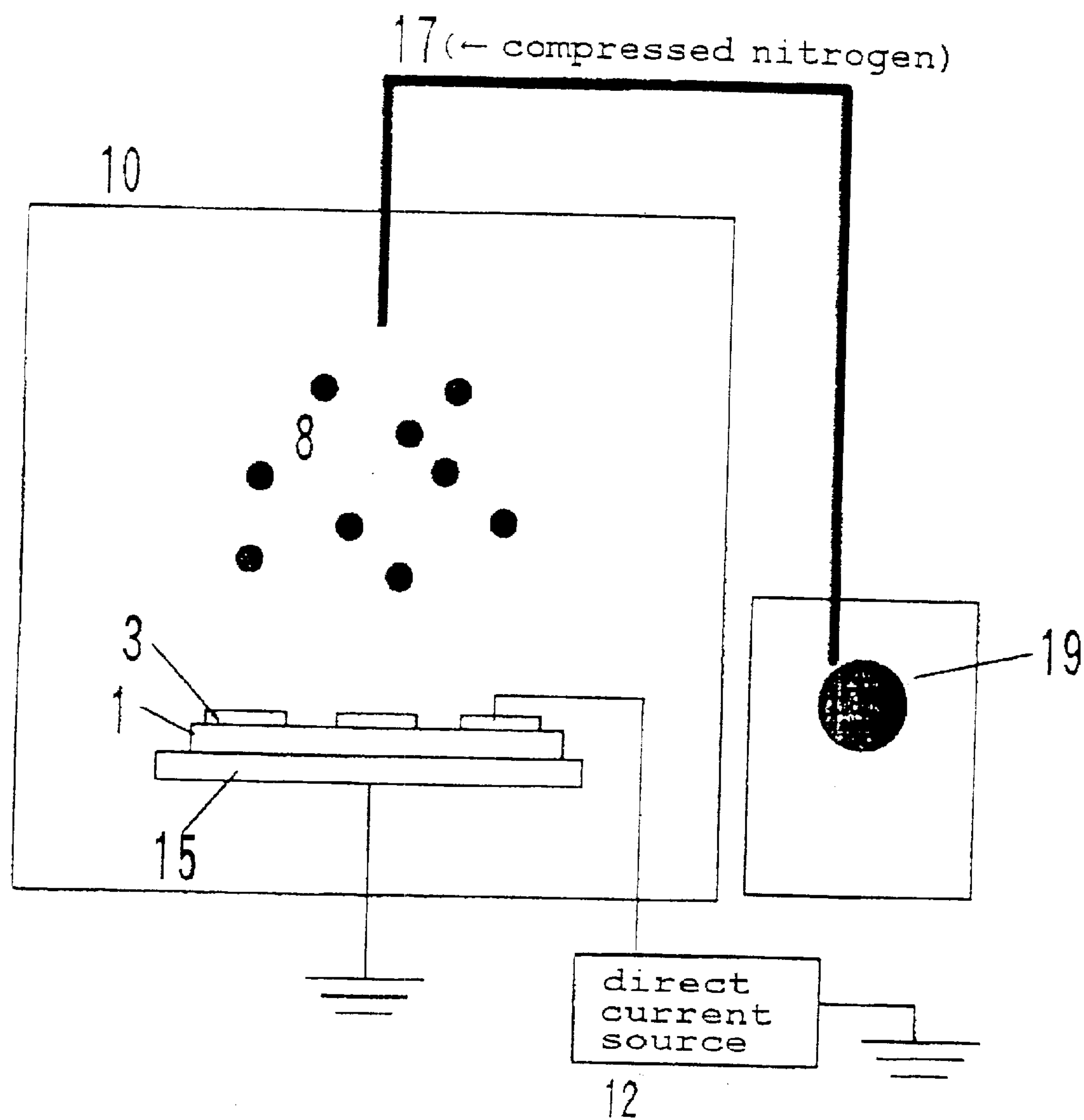
FIG. 29 is a schematic sectional view of a spacer sprayer to be used in the practice of the method for producing a liquid crystal display device according to an aspect of the present invention.

The sprayer used was a dry method sprayer produced by Nisshin Engineering Co., as shown in FIG. 29. On an earthed conductive aluminum stage was placed an antistatic mat having a surface resistance of not more than $10^7$ Ωcm in close contact with the stage, and the substrate was disposed thereon in close contact therewith. Further, the voltage application apparatus was provided with a connecting terminal for voltage application and the wire therefrom was introduced into the spray chamber so that a voltage might be supplied to the substrate.

Micropearl BBS-PH (trademark; product of Sekisui Fine Chemical; particle size: 6.8 μm) were prepared as the spacers.

Then, a voltage of −2.5 kV was applied to all ITO electrodes on the substrate. While maintaining this state, the spacers were passed through a stainless steel piping (whereby the spacers were charged negatively (−)) and sprayed onto the substrate using compressed air at a pressure of 1.75 kg/cm$^2$. That the spacers were negatively charged was confirmed beforehand.

Observation of the substrate having the spacers disposed thereon under a light microscope revealed that the spacers were located in the interelectrode gaps. Thus, the spacers were found in black matrix sites.

Thereafter, that conductor portion of the spacer-carrying substrate was cut off, followed by the conventional steps of sealing, laminating, substrate cutting, liquid crystal filling and so on, to give a liquid crystal display device.

EXAMPLE 2

A common electrode substrate for STN type LCD production (glass substrate provided with pattern-forming linear transparent electrodes, a black matrix made of metallic chromium and color filters; aperture size of each of RGB pixels =80×280 μm, black matrix line width=35 μm, acrylic resin overcoat layer=3.0 μm, ITO electrode line width=290 μm, interelectrode distance=25 μm, glass thickness=0.7 μm) was prepared as the substrate.

On this substrate was formed a 0.05-μm-thick polyimide alignment layer, which was subjected to rubbing treatment.

The substrate electrodes had such a constitution as shown in FIG. 3.

Using this substrate, the procedure of Example 1 was followed in the same manner except that a voltage of −2.0 kV was applied to the ITO electrodes.

Microscopic observation of the substrate having the spacers disposed thereon revealed that the spacers were located in the interelectrode gaps. Thus, they were found at black matrix sites.

EXAMPLE 3

The procedure of Example 1 was followed in the same manner except that the antistatic mat was removed and the substrate was disposed directly on the conductive aluminum stage.

Observation of the substrate having the spacers disposed thereon under a light microscope revealed that the spacers were located in the interelectrode gaps. Thus, they were found at black matrix sites.

Comparative Example 1

The procedure of Example 1 was repeated except that plastic pins were erected on the conductive aluminum stage and the substrate was placed thereon, so that the substrate was kept insulated from the stage by air.

Observation of the substrate having the spacers disposed thereon under a light microscope revealed that the spacers were located also in the display electrode sites. Thus, the spacers were disposed nearly randomly.

Comparative Example 2

The procedure of Example 1 was followed in the same manner except that the voltage applied to all ITO electrodes was −1.0 kV.

Observation of the substrate having the spacers disposed thereon under a light microscope revealed that the spacers were located also in the display electrode sites. Thus, the spacers were disposed nearly randomly.

EXAMPLE 4

A dummy electrode-free common electrode substrate for STN type LCD production (glass substrate provided with pattern-forming linear transparent electrodes, a black matrix made of metallic chromium and pigment dispersion type color filters; aperture size of each of RGB pixels=80×285 μm, RGB layer thickness=1.5 μm, metallic chromium black matrix line width =20 μm, acrylic resin overcoat layer=3.0 μm, ITO electrode line width=290 μm, interelectrode distance=15 μm, glass thickness=0.7 mm), as shown in FIG. 3, was prepared as the substrate.

On this substrate was formed a 0.05-μm-thick polyimide alignment layer, which was subjected to rubbing treatment.

All ITO electrode ends, on one side, were connected with a voltage application tool having a number of needle electrodes, which tool was connected with a voltage application apparatus so that a direct current voltage might be applied to the ITO electrodes on the substrate.

Further, the black matrix was partly exposed by partly scraping off the ITO electrode layer and overcoat layer outside the display area and the exposed parts were connected with another voltage application apparatus so that a direct current voltage might be applied also to the black matrix portions. The two voltage application apparatus could each be arbitrarily adjusted with respect to voltage and voltage polarity.

The substrate was placed in the spray chamber in a state insulated from the stage in the same manner as in Comparative Example 1.

Micropearl BBS-PH (trademark; product of Sekisui Fine Chemical; particle size: 5.3 μm) were prepared as the spacers.

Then, a voltage of −2.50 kV was applied to all ITO electrodes on the substrate and a voltage of −2.48 kV to the black matrix portions, to give a potential difference of 20 V therebetween. While maintaining this state, the spacers were passed through a stainless steel piping (whereby the spacers were charged negatively (−)) and sprayed onto the substrate using compressed air at a pressure of 1.75 kg/cm$^2$. That the spacers were negatively charged was confirmed beforehand.

Observation of the substrate having the spacers disposed thereon under a light microscope revealed that the spacers had been disposed at black matrix sites.

EXAMPLE 5

A substrate constituted in the same manner as that used in Example 4 except that linear transparent electrodes and a dummy electrode were formed on the overcoat layer surface and the linear transparent electrodes were connected with the dummy electrode, as shown in FIG. 5, was used, and a voltage was applied to the dummy electrode and black matrix portions using separate voltage application apparatus. The black matrix portions were constituted so as to enable voltage application thereto in the same manner as in Example 4.

By applying a voltage to the dummy electrode portion, the same voltage was applied to the linear transparent electrodes as well. The voltage applied to the dummy electrode part was −2.50 kV and that applied to the black matrix portions was −2.48 kV, just as in Example 4. Thereafter, the procedure of Example 4 was followed.

Observation of the substrate having the spacers disposed thereon under a light microscope revealed that the spacers had been disposed uniformly at black matrix sites all over the display area, even in its marginal area. The state of spacer disposition in the marginal part of the display area was still more improved as compared with Example 4.

Then, this substrate was used to complete a liquid crystal display device by the conventional process. The thus-completed liquid crystal display device showed high contrast and no display unevenness all over the display area upon observation of the display on the screen thereof.

EXAMPLE 6

A substrate constituted in the same manner as in Example 2 except that linear transparent electrodes and a dummy electrode were formed thereon and the linear transparent electrodes were connected with the dummy electrode, as shown in FIG. 5, was used and the procedure of Example 2 was followed.

Observation of the substrate having the spacers disposed thereon under a light microscope revealed that the spacers had been disposed at black matrix sites all over the display area and in particular that spacers had been disposed uniformly at such sites in the marginal part of the display area as well. The state of spacer disposition in the marginal part of the display area was still more improved as compared with Example 4.

Then, this substrate was used to complete a liquid crystal display device by the conventional process. The thus-completed LCD showed high contrast and no display unevenness all over the display area upon observation of the display on the screen thereof.

EXAMPLE 7

The procedure of Example 2 was followed in the same manner except that the voltage applied was −6.0 kV. Discharge, hence short-circuiting, occurred between the ITO electrodes and the black matrix.

EXAMPLE 8

In the procedure of Example 4, a voltage of −2.0 kV was applied to the ITO electrodes and +100 V to the black matrix. Discharge, hence short-circuiting, occurred between the ITO electrodes and the black matrix.

EXAMPLE 9

The procedure of Example 1 was followed in the same manner except that a dummy electrode was formed in the manner shown in FIG. 5 and all linear transparent electrodes were connected with the dummy electrode.

Observation of the substrate having the spacers disposed thereon under a light microscope revealed that the spacers had been disposed at black matrix sites all over the display area and in particular that spacers had been disposed uniformly at such sites in the marginal part of the display area as well. The state of spacer disposition in the marginal part of the display area was still more improved as compared with Example 1.

Then, this substrate was used to complete a liquid crystal display device by the conventional process. The thus-completed LCD showed high contrast and no display unevenness all over the display area upon observation of the display on the screen thereof.

EXAMPLE 10

The procedure of Example 2 was followed in the same manner except that a substrate having a structure such that linear transparent electrodes and a dummy electrode were formed thereon but the linear transparent electrodes were not connected with the dummy electrode was used and that a voltage of −2.0 kV was applied to all linear transparent electrodes by means of a voltage application apparatus comprising bar electrodes and −2.03 kV to the dummy electrode using another voltage application apparatus.

Observation of the substrate having the spacers disposed thereon under a light microscope revealed that the spacers had been disposed at black matrix sites all over the display area and in particular that spacers had been disposed uniformly at such sites in the marginal part of the display area as well.

EXAMPLE 11

A common electrode substrate for STN type LCD production (glass substrate provided with pattern-forming linear transparent electrodes, a black matrix made of a resin and color filters; aperture size of each of RGB pixels=80×280 μm, black matrix line width=35 μm, acrylic resin overcoat layer =3.0 μm, ITO electrode line width=290 μm, interelectrode distance=25 μm, glass thickness=0.7 mm) was prepared as the substrate.

On this substrate was formed a 0.05-μm-thick polyimide alignment layer, which was subjected to rubbing treatment.

The substrate was of a type for producing two final substrates, namely it had two display areas formed thereon.

The ITO electrodes were formed with a margin of about 10 mm from each edge line of the substrate, as shown in FIG. 5 and the dummy electrode was connected with a voltage application apparatus so that upon voltage application to the dummy electrode on the substrate, a direct current voltage might be applied to all ITO electrodes on the substrate.

Figure 30:
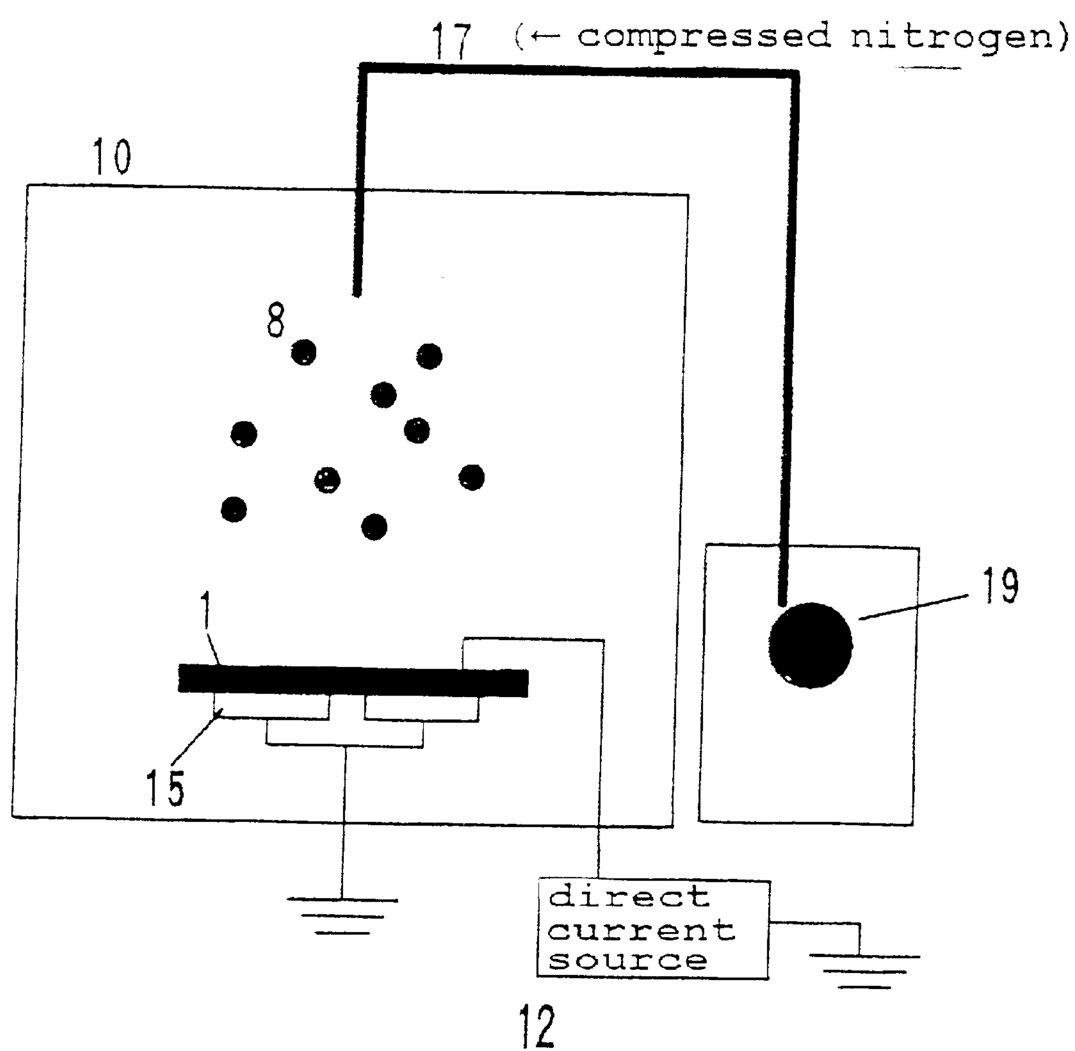
FIG. 30 is a schematic sectional view of a spacer sprayer to be used in the practice of the method for producing a liquid crystal display device according to an aspect of the present invention.

The sprayer used was Nisshin Engineering model DISPA-μR (trademark) sprayer, as shown in FIG. 30. The conductive stage was almost identical in shape and size with the ITO electrode region on the substrate and thus had a size such that each edge was about 10 mm inside the corresponding substrate edge, as shown in FIG. 11, and such stage was disposed within the sprayer. A connecting terminal for voltage application as connected with the voltage application apparatus was provided within the spacer and a wiring was led into the sprayer so that voltage supply might be made to the substrate.

Micropearl BB-PH (trademark; product of Sekisui Fine Chemical; particle size: 7.25 μm) were prepared as the spacers.

Then, a voltage of −2.0 kV was applied to all ITO electrodes on the substrate by voltage application to the dummy electrode. While maintaining this state, the spacers were passed through a stainless steel piping (whereby the spacers were charged negatively (−)) and sprayed onto the substrate using compressed nitrogen gas. That the spacers were negatively charged was confirmed beforehand.

Observation of the substrate having the spacers disposed thereon under a light microscope revealed that the spacers were located in the interelectrode gaps, namely at black matrix sites.

Thereafter, this substrate was used to complete a liquid crystal display device by the conventional process. The thus-completed LCD showed high contrast because of no occurrence of spacers in pixel sites, unlike the case of spacer spraying by the prior art method of LCD production. Its display performance was characterized by good display uniformity owing to spacer disposition all over the display area.

EXAMPLE 12

The procedure of Example 11 was followed in the same manner except that the black matrix used was a metallic chromium black matrix with a line width of 35 μm and the conductive stage used was consisted of two divided portions respectively corresponding to the two display areas on the substrate in a manner such that the divided portions each was 5 mm inside from each picture frame edge of the black matrix of the relevant display area.

Observation of the substrate having the spacers disposed thereon under a light microscope revealed that the spacers had been disposed in interelectrode gaps, namely at black matrix sites.

Thereafter, this substrate was used to complete a liquid crystal display device by the conventional process. The thus-completed LCD showed high contrast because of no occurrence of spacers in pixel sites, unlike the case of spacer spraying by the prior art method of LCD production. Its display performance was characterized by good display uniformity owing to spacer disposition all over the display area.

EXAMPLE 13

The procedure of Example 11 was followed in the same manner except that the conductive stage used was larger by 50 mm than the substrate.

Observation of the substrate having the spacers disposed thereon under a light microscope revealed that the spacers had been disposed in interelectrode gaps, namely at black matrix sites but that almost no spacers had been disposed over about 30 mm on the periphery of the display area.

Thereafter, this substrate was used to complete a liquid crystal display device by the conventional process. The thus-completed LCD showed high contrast and good display performance in the central portion of the display area. In the peripheral portions of the display area, however, the cell thickness was decreased because of absence of spacers, hence display unevenness was observed.

EXAMPLE 14

The procedure of Example 12 was followed in the same manner except that the conductive stage used had a size of 40%, 30% or 20% of the display area.

Each substrate having the spacers disposed thereon was observed under a light microscope and then used to complete a liquid crystal display device by the conventional process.

When the conductive stage had a size of 40% of the display area, the spacers were disposed in interelectrode gaps, namely at black matrix sites, like in Example 12, and the liquid crystal display device completed showed high contrast owing to the absence of spacers at pixel sites and was characterized by good display uniformity owing to the disposition of spacers all over the display area.

When the conductive stage had a size of 30% of the display area, some spacers had been disposed at pixel sites as well. With the liquid crystal display device completed, however, the contrast was little influence by the small number of spacers disposed at pixel sites, and the device showed high contrast. When the conductive stage had a size of 20% of the display area, the spacers were disposed randomly on the display area and the liquid crystal display device completed showed no improvement in contrast.

EXAMPLE 15

A common electrode substrate for STN type LCD production (glass substrate provided with pattern-forming linear transparent electrodes, a metallic chromium black matrix and color filters; aperture size of each of RGB pixels=80×280 μm, metallic chromium black matrix line width=35 μm, acrylic resin overcoat layer=3.0 μm, ITO electrode width=290 μm, interelectrode distance=25 μm, glass thickness=0.7 mm) was prepared as the substrate.

On this substrate was formed a 0.05-μm-thick polyimide alignment layer, which was subjected to rubbing treatment. Then, the substrate was washed by showering with pure water and then drained with an air knife.

The ITO electrodes were formed as shown in FIG. 5, so that a voltage might be applied to all linear transparent electrodes by applying the voltage to a site outside the display area. However, cutting the conductor portions after spacer spraying gave a common electrode substrate not essentially differing from the ordinary one.

Figure 31:
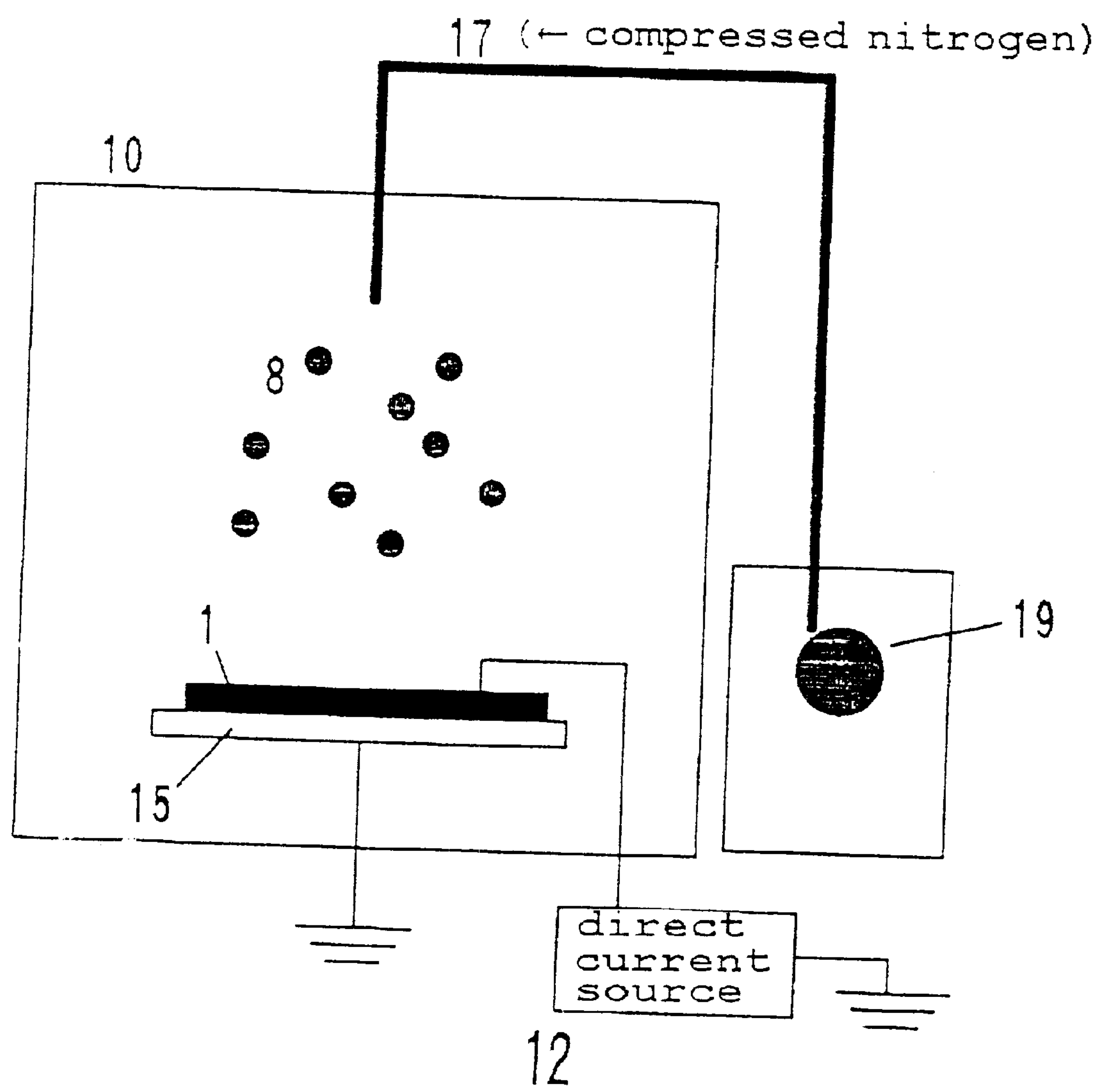
FIG. 31 is a schematic sectional view of a spacer sprayer to be used in the practice of the method for producing a liquid crystal display device according to an aspect of the present invention.

The sprayer used was a dry method sprayer produced by Nisshin Engineering Co., as shown in FIG. 31. A connecting terminal for voltage application as connected with a voltage application apparatus was provided in the sprayer and a wire conductor was passed into the sprayer so that a voltage might be supplied to the substrate.

Micropearl BBP (trademark; product of Sekisui Fine Chemical; particle size: 7.25 μm) were prepared as the spacers.

Then, as the heating/drying step prior to spacer spraying, the color filter substrate prepared in the above manner was dried by heating in an oven at 90° C. for 30 minutes for removing moisture. After the drying step, the substrate was disposed on an earthed conductive stainless steel stage in close contact therewith and, after confirming that the substrate showed no warp, the terminal of a direct current power source was connected with the ITO electrodes at sites outside the display area. A voltage of +2.00 kV was then applied, followed by feeding spacers through a stainless steel pipeline (whereby spacers were charged positively (+)) and spraying them onto the substrate under compressed nitrogen. That the spacers were charged negatively on that occasion was confirmed beforehand.

The working environment in spacer spraying was at room temperature (23° C.) and a relative humidity of 70%. When a voltage of 1 kV was applied to the transparent electrodes on the above substrate after heating, the current flowing between the transparent electrodes and the stage was found to be on the order of 10–12 A.

Observation of the substrate having the spacers disposed thereon under a light microscope revealed that the spacers had been disposed linearly in gaps between the respective neighboring ITO electrodes. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 16

The procedure of Example 15 was followed in the same manner except that the step of heating/drying the substrate prior to spacer spraying was omitted. The current flowing between the transparent electrodes and the stage upon application of a voltage of 1 kV to the transparent electrodes on the substrate was checked and found to be in the order of $10^{-5}$ A.

Observation of the substrate having the spacers disposed thereon under a light microscope revealed that the spacers had been disposed not only in ITO electrode gaps but also abundantly on ITO electrodes, namely at display pixels as well.

Thereafter, the substrate was used to complete a liquid crystal display device by the conventional process. The thus-completed LCD was inferior in contrast to the LCD of Example 15 as a result of the influence of spacer-due light leakage.

EXAMPLE 17

The procedure of Example 15 was followed in the same manner except that the substrate was heated at a temperature of 40° C. for 30 minutes. The current flowing between the transparent electrodes and the stage upon application of a voltage of 1 kV to the transparent electrodes on the substrate was checked and found to be in the order of $10^{-5}$ A.

Observation of the substrate having the spacers disposed thereon under a light microscope revealed that the spacers had been disposed not only in ITO electrode gaps but also on ITO electrodes, namely at display pixel sites.

Thereafter, the substrate was used to complete a liquid crystal display device by the conventional process. The thus-completed LCD was inferior in contrast to the LCD of Example 15 as a result of the influence of spacer-due light leakage.

EXAMPLE 18

The procedure of Example 15 was followed in the same manner except that the procedure mentioned below was performed in lieu of the step of heating/drying substrates prior to spacer spraying.

A hot plate was provided in the spray chamber, and a thin aluminum sheet was further disposed thereon in close contact with the top of the hot plate. The aluminum sheet was earthed, the hot plate was heated, and the aluminum surface was maintained at 150° C. Then, the substrate was disposed in close contact with the aluminum sheet, a voltage of +2.00 kV was applied to the transparent electrode portions and, 3 minutes later, spacer spraying was carried out in the same manner as in Example 15. The current flowing between the transparent electrodes and the stage upon application of a voltage of 1 kV to the transparent electrodes on the substrate was checked and found to be about $10^{-11}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 19

The procedure of Example 15 was followed in the same manner except that dry nitrogen gas at a gas temperature of 45° C. was blown onto the substrate from above and from below in lieu of the step of heating/drying substrates prior to spacer spraying. The current flowing between the transparent electrodes and the stage upon application of a voltage of 1 kV to the transparent electrodes on the substrate was checked and found to be about $10^{-11}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 20

The procedure of Example 15 was followed in the same manner except that the substrate was dipped in acetone and then the acetone was removed from the substrate by means of an air knife in lieu of the step of heating/drying substrates prior to spacer spraying. The current flowing between the transparent electrodes and the stage upon application of a voltage of 1 kV to the transparent electrodes on the substrate was checked and found to be about $10^{-7}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 21

The procedure of Example 15 was followed in the same manner except that the substrate was placed in a vacuum drier and allowed to stand under vacuum (1 Pa) for 5 hours and then the voltage application to the linear transparent electrodes and spacer spraying were immediately carried out in lieu of the step of heating/drying substrates prior to spacer spraying. The current flowing between the transparent electrodes and the stage upon application of a voltage of 1 kV to the transparent electrodes on the substrate was checked and found to be about $10^{-11}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 22

The procedure of Example 15 was followed in the same manner except that the environment for storing substrate and the working environment for spacer spraying were both controlled at room temperature (23° C.) and a relative humidity of 40% and the step of heating/drying substrates prior to spacer spraying was omitted. The current flowing between the transparent electrodes and the stage upon application of a voltage of 1 kV to the transparent electrodes on the substrate was checked and found to be in the order of $10^{-7}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 23

The procedure of Example 15 was followed in the same manner except that the environment for storing substrate and the working environment for spacer spraying were both controlled at room temperature (23° C.) and a relative humidity of 85% and the step of heating/drying substrates prior to spacer spraying was omitted. The current flowing between the transparent electrodes and the stage upon application of a voltage of 1 kV to the transparent electrodes on the substrate was checked and found to be in the order of $10^{-5}$ A.

Observation of the substrate having the spacers disposed thereon under a light microscope revealed that the spacers had been disposed not only in ITO electrode gaps but also abundantly on ITO electrodes, namely at display pixel sites as well.

Thereafter, the substrate was used to complete a liquid crystal display device by the conventional process. The thus-completed LCD was inferior in contrast to the LCD of Example 15 as a result of the influence of spacer-due light leakage.

EXAMPLE 24

The substrate was stored beforehand in an environment maintained at room temperature (23° C.) and a relative humidity of 20% and thereafter the procedure of Example 15 was immediately followed. The step of heating/drying substrates prior to spacer spraying was omitted and the working environment for spacer spraying was controlled at room temperature (23° C.) and a relative humidity of 50%. The current flowing between the transparent electrodes and the stage upon application of a voltage of 1 kV to the transparent electrodes on the substrate was checked and found to be in the order of $10^{-8}$ A.

Observation of the substrate having the spacers disposed thereon under a light microscope revealed that the spacers had been disposed linearly in the ITO electrode gaps. Thus, no spacer was found within any display pixel site.

Thereafter, the substrate was used to complete a liquid crystal display device by the conventional process. The thus-completed LCD showed high contrast and good display characteristics owing to the absence of spacer-due light leakage.

EXAMPLE 25

The substrate was stored beforehand in an environment maintained at room temperature (8° C.) and a relative humidity of 10% and thereafter the procedure of Example 15 was immediately followed. The step of heating/drying substrates prior to spacer spraying was omitted and the working environment for spacer spraying was controlled at room temperature (23° C.) and a relative humidity of 50%. The current flowing between the transparent electrodes and the stage upon application of a voltage of 1 kV to the transparent electrodes on the substrate was checked and found to be in the order of $10^{-5}$ A.

Observation of the substrate having the spacers disposed thereon under a light microscope revealed that the spacers had been disposed not only in ITO electrode gaps but also abundantly on ITO electrodes, namely at display pixel sites as well.

Thereafter, the substrate was used to complete a liquid crystal display device by the conventional process. The thus-completed LCD was inferior in contrast to the LCD of Example 15 as a result of the influence of spacer-due light leakage.

EXAMPLE 26

A common electrode substrate for STN type LCD production (glass substrate provided with pattern-forming linear transparent electrodes, a metallic chromium black matrix and color filters; aperture size of each of RGB pixels=80×280 μm, metallic chromium black matrix line width=25 μm, acrylic resin overcoat layer=3.0 μm, ITO electrode width=290 μm, interelectrode distance=15 μm, glass thickness=0.7 mm) was prepared as the substrate.

On this substrate was formed a 0.05-μm-thick polyimide alignment layer, which was subjected to rubbing treatment.

All transparent electrodes (ITO electrodes, stripe electrodes) on the substrate were connected within the dummy electrode region to a voltage application apparatus so that a direct current voltage might be applied to all ITO electrodes on the substrate. The voltage application apparatus could arbitrarily be adjusted with respect to voltage value and voltage polarity.

The sprayer used was Nisshin Engineering's DISPA-μR (trademark, dry method sprayer). The substrate was disposed in close contact with an earthed stainless steel conductive stage. A terminal of the voltage application apparatus (direct current power source) for voltage application was provided within the spacer and a wiring was led into the sprayer and connected with the dummy electrode on the substrate so that voltage supply might be made to all ITO electrodes on the substrate.

Micropearl BB-PH (trademark; product of Sekisui Fine Chemical; particle size: 7.25 μm) were prepared as the spacers.

Then, a voltage of −2.3 kV was applied to all ITO electrodes on the substrate for 1 minute.

Thereafter, the terminal of the voltage application apparatus was disconnected, and the spacers were passed through a stainless steel piping (whereby the spacers were charged negatively (−)) and sprayed onto the substrate by means of compressed air. That the spacers were negatively charged was confirmed beforehand.

Observation of the substrate having the spacers disposed thereon under a light microscope revealed that almost all the spacers had been disposed in the interelectrode gaps, namely at black matrix sites.

EXMPLE 27

In Example 26, an aluminum foil was brought into close contact with the whole reverse side of the substrate, the terminal of the voltage application apparatus was connected with the dummy electrode on the substrate on an earthed stainless steel plate, and a voltage of −2.5 kV was applied to all ITO electrodes for 1 minute.

Thereafter, the terminal of the voltage application apparatus was disconnected, the substrate and the aluminum foil, in close contact with each other, were transferred onto the earthed stainless steel stage in the spray chamber, and spacer spraying was carried out in the same manner as in Example 26.

Observation of the substrate having the spacers disposed thereon under a light microscope revealed that almost all the spacers had been disposed in the interelectrode gaps, namely at black matrix sites.

EXAMPLE 28

In Example 26, an aluminum foil was brought into close contact with the whole reverse side of the substrate, the terminal of the voltage application apparatus was connected with the dummy electrode on the substrate on an earthed stainless steel plate, and a voltage of −2.5 kV was applied to all ITO electrodes for 1 minute.

Thereafter, the terminal of the voltage application apparatus was disconnected, the substrate and the aluminum foil, in close contact with each other, were transferred onto an insulating table (made of a vinyl chloride resin) in the spray chamber, and spacer spraying was carried out in the same manner as in Example 26.

Observation of the substrate having the spacers disposed thereon under a light microscope revealed that almost all the spacers had been disposed in the interelectrode gaps, namely at black matrix sites.

EXAMPLE 29

A common electrode substrate for STN type LCD production (glass substrate provided with pattern-forming linear transparent electrodes, a metallic chromium black matrix and color filters; aperture size of each of RGB pixels=80×280 μm, metallic chromium black matrix line width=25 μm, acrylic resin overcoat layer=3.0 μm, ITO electrode width=290 μm, interelectride distance=15 μm, glass thickness=0.7 mm) was prepared as the substrate.

On this substrate was formed a 0.05-μm-thick polyimide alignment layer, which was subjected to rubbing treatment.

All transparent electrodes (ITO electrodes, stripe electrodes) on the substrate were connected within the dummy electrode region to a voltage application apparatus so that a direct current voltage might be applied to all ITO electrodes on the substrate. The voltage application apparatus could arbitrarily be adjusted with respect to voltage value and voltage polarity.

The sprayer used was Nisshin Engineering's DISPA-μR (trademark, dry method sprayer). The substrate was disposed in close contact with an earthed stainless steel conductive stage. A terminal of the voltage application apparatus (direct current power source) for voltage application was provided within the spacer and a wiring was led into the sprayer and connected with-the dummy electrode on the substrate so that voltage supply might be made to all ITO electrodes on the substrate.

Micropearl BB-PH (trademark; product of Sekisui Fine Chemical; particle size: 7.25 μm) were prepared as the spacers.

Then, a voltage of −2.0 kV was applied to all ITO electrodes on the substrate.

Immediately after voltage application (the duration of voltage application being zero) or after 1 second, 3 seconds, 5 seconds, 10 seconds or 60 seconds of voltage application, spacers were passed through a stainless steel pipeline (whereby the spacers were charged negatively (−)) and sprayed onto the substrate by means of compressed air. That the spacers were negatively charged was confirmed beforehand. During spacer spraying, the voltage of −2.0 kV was continuously applied to all ITO electrodes.

Each substrate having the spacers disposed thereon was observed under a light microscope and the state of spacer disposition was evaluated in terms of disposition percentage, as follows.

[Disposition percentage (%)]=[number of spacers disposed at black matrix sites per certain number of pixels]/[total number of spacers per the certain number of pixels]

The results thus obtained are shown in Table 1.

TABLE 1

| Duration of voltage application before spraying (seconds) | 0 | 1 | 3 | 5 | 10 | 60 |
|---|---|---|---|---|---|---|
| Disposition percentage (%) | 92 | 94 | 95 | 98 | >99 | >99 |

EXAMPLE 30

A color filter substrate (glass substrate provided with pattern-forming linear transparent electrodes, a metallic chromium black matrix and a pigment dispersion type color filter layer formed thereon; aperture size of each of RGB pixels=80×280 μm, metallic chromium black matrix line width=35 μm, pigment dispersion type color filter layer thickness=about 1.5 μm, acrylic resin overcoat layer=3.0 μm, glass thickness=0.7 mm) was prepared as the first substrate.

Figure 23:
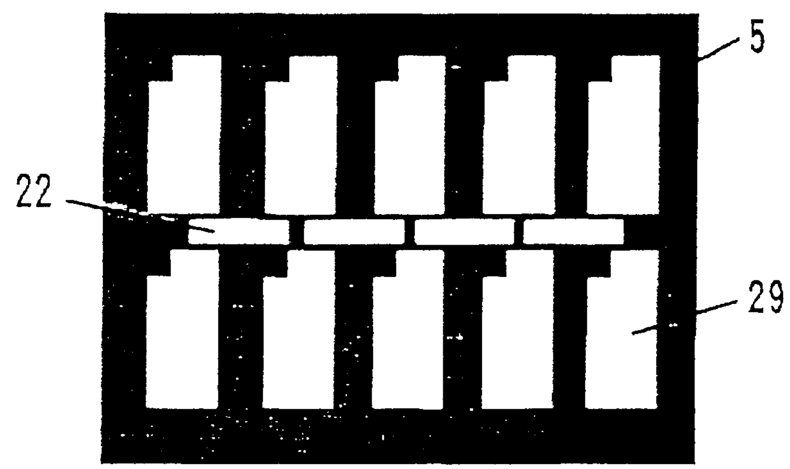
FIG. 23 is a schematic plan view illustrating a still further embodiment of-the first substrate of the present invention, with etched areas formed thereon.

Then, rectangular etched areas, 25 μm×100 μm in size, were formed over and within the expanse of the corresponding black matrix areas formed centrally in the horizontal direction, as shown in FIG. 23.

On this substrate was formed a 0.05-μm-thick polyimide alignment layer, which was subjected to subbing treatment.

The transparent electrodes were connected with a voltage application apparatus at sites outside the display area on the color filter substrate and, further, the transparent electrode layer and overcoat layer were partly scraped off to expose part of the chromium black matrix and the black matrix portions were also connected with another voltage application apparatus so that a direct current voltage might be applied thereto. The two voltage application apparatus could arbitrarily be adjusted with respect to voltage value and voltage polarity.

Figure 32:
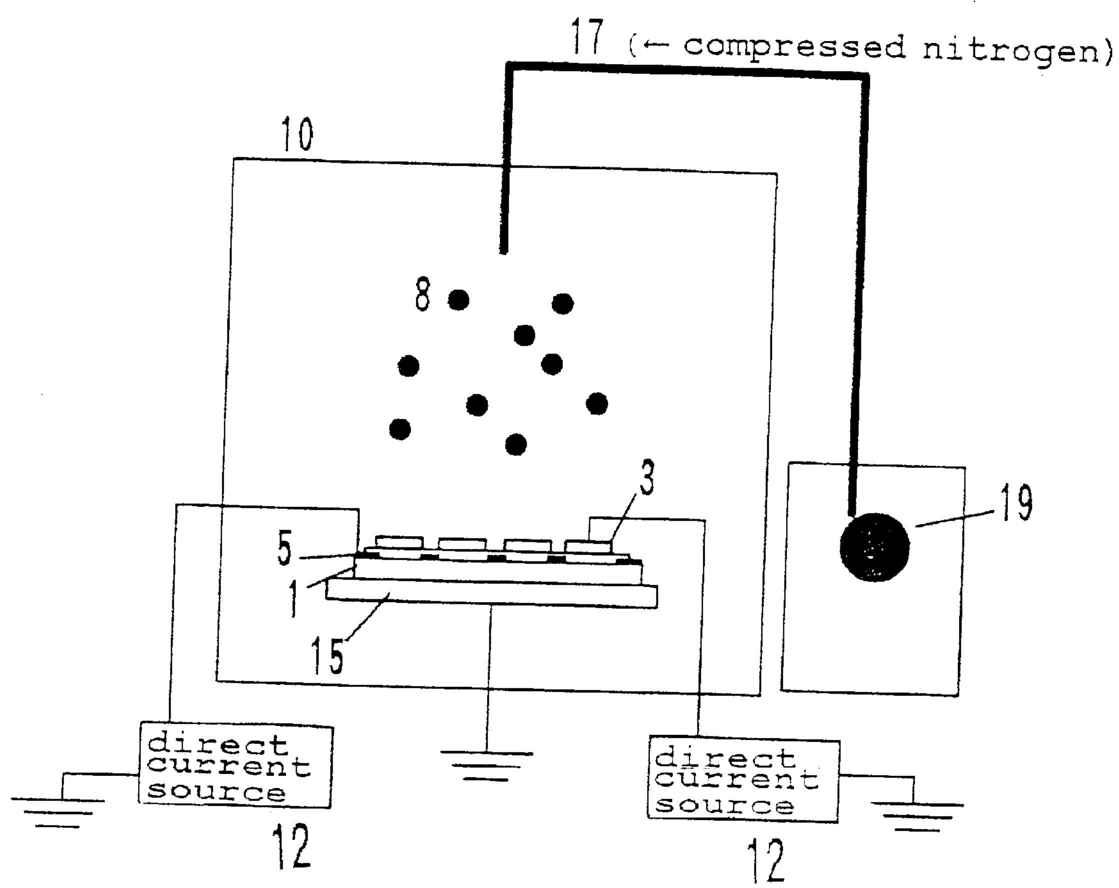
FIG. 32 is a schematic sectional view of a spacer sprayer to be used in the practice of the method for producing a liquid crystal display device according to an aspect of the present invention.

The sprayer used was a Nisshin Engineering dry sprayer, as shown in FIG. 32. The substrate was disposed on an earthed stainless steel conductive stage in close contact with the same. Terminals for voltage application as connected with the respective voltage application apparatus were provided within the sprayer and wirings were led into the sprayer so that voltage supply to the substrate might be made.

Micropearl SP (trademark; product of Sekisui Fine Chemical; particle size: 5.25 μm) were prepared as the spacers.

Then, a voltage of −1.5 kV was applied to the transparent electrodes on the substrate, and a voltage of −1.48 kV to the black matrix portions (transparent electrodes: relative −, black matrix portions: relative +). While maintaining this state, spacers were passed through a stainless steel pipeline (whereby the spacers were charged negatively) and sprayed onto the substrate by means of compressed air. That the spacers are charged negatively was confirmed beforehand.

Figure 33:
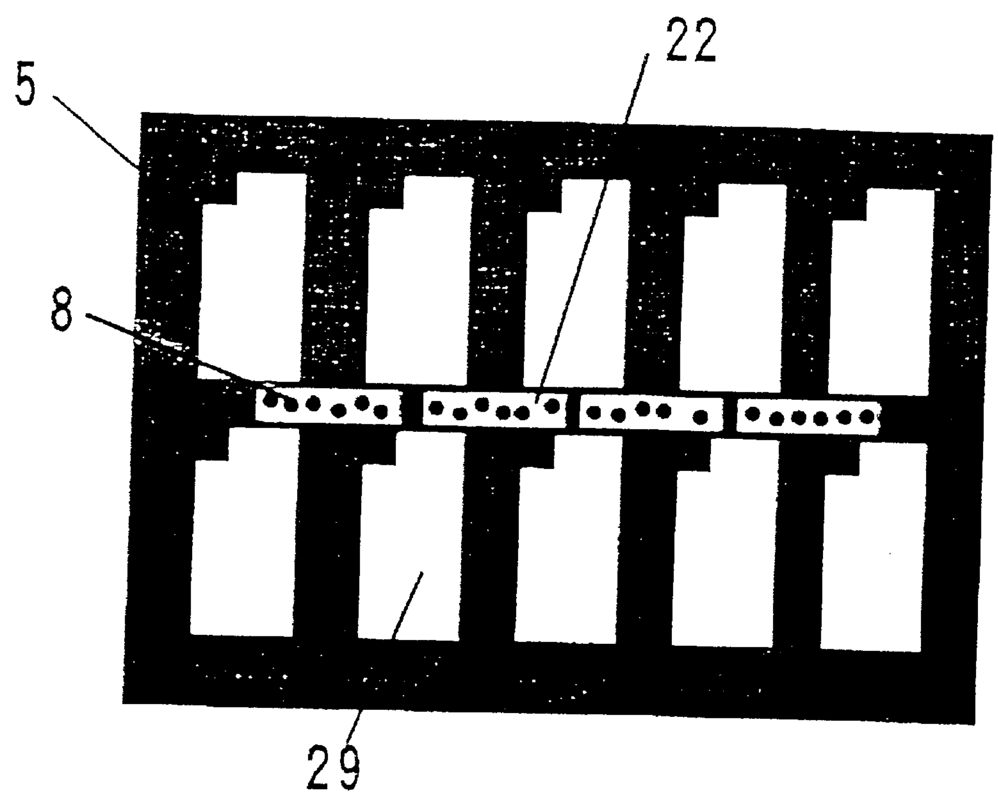
FIG. 33 is a plan view illustrating the state after spacer spraying onto the substrate shown in FIG. 23.

Observation of the first substrate having the spacers disposed thereon under a light microscope revealed that the spacers had been disposed in the etched areas alone, as shown in FIG. 33.

Thereafter, the substrate was used to complete a TFT type liquid crystal display device by the conventional process. Upon screen observation, the thus-completed TFT type LCD showed high contrast owing to the absence of spacers in the display area.

EXAMPLE 31

Using the same substrate as used in Example 30, a voltage of −2.0 kV was applied from a voltage application apparatus to the transparent electrodes but the terminal of the voltage application apparatus was not connected to the black matrix portions. Otherwise, the procedure of Example 30 was followed.

Observation of the first substrate having the spacers disposed thereon under a light microscope revealed that the spacers had been disposed in the etched areas alone.

EXAMPLE 32

The procedure of Example 31 was followed in the same manner except that an antistatic mat having a resistance value of not more than $10^7$ Ωcm was disposed on the stainless steel conductive stage in the spacer sprayer in close contact with the stage and the first substrate was disposed thereon in close contact.

Observation of the first substrate having the spacers disposed thereon under a light microscope revealed that the spacers had been disposed in the etched areas alone.

EXAMPLE 33

The procedure of Example 30 was followed in the same manner except that an antistatic mat having a resistance value of not more than $10^7$ Ωcm was disposed on the stainless steel conductive stage in the spacer sprayer in close contact with the stage and the first substrate was disposed thereon in close contact.

Observation of the first substrate having the spacers disposed thereon under a light microscope revealed that the spacers had been disposed in the etched areas alone.

Comparative Example 3

An attempt was made to follow the procedure of Example 30 by applying a voltage of −1.5 kV to the transparent electrodes and a voltage of −1.3 kV to the black matrix portions. However, short-circuiting occurred between the transparent electrodes and the conductive black matrix and, as a result, voltage application could not be carried out.

EXAMPLE 34

A color filter substrate (glass substrate provided with pattern-forming linear transparent electrodes, a metallic chromium black matrix and color filters formed thereon; aperture size of each of RGB pixels=80×280 μm, metallic chromium black matrix line width in stripe direction=25 μm, black matrix line width perpendicular to stripe direction=35 μm) was prepared as the first substrate.

Figure 28:
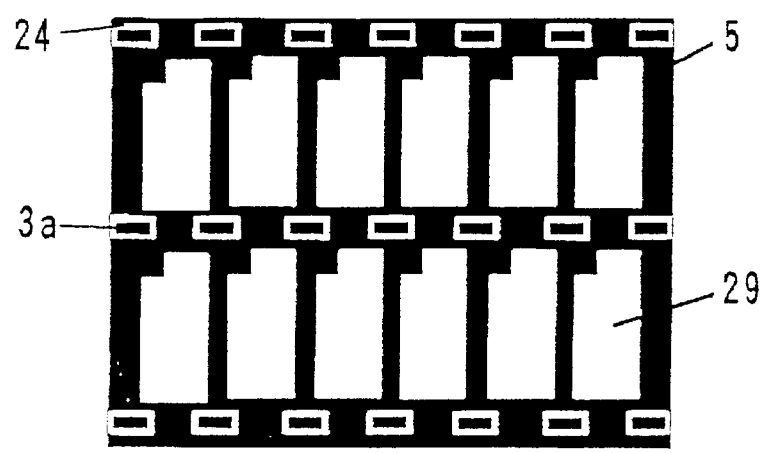
FIG. 28 is a schematic plan view illustrating a still further embodiment of the first substrate of the present invention, with isolated transparent electrodes formed thereon.

Then, a number of rectangular isolated transparent electrodes, 11 μm×40 μm in size, were formed in those sites of the transparent electrodes corresponding to crossings of the black matrix, as shown in FIG. 28, by forming 5-μm-wide etched lines within the range of each 35-μm-wide conductive black matrix line and 7 μm apart from the border thereof.

On this substrate was formed a 0.05-μm-thick polyimide alignment layer, which was subjected to rubbing treatment.

The transparent electrodes were connected with a voltage application apparatus at sites outside the display area on the color filter substrate so that the transparent electrodes other than the isolated transparent electrodes might be connected with the voltage application apparatus and a DC voltage might be applied thereto. The voltage application apparatus could arbitrarily be adjusted with respect to voltage value and voltage polarity.

Figure 34:
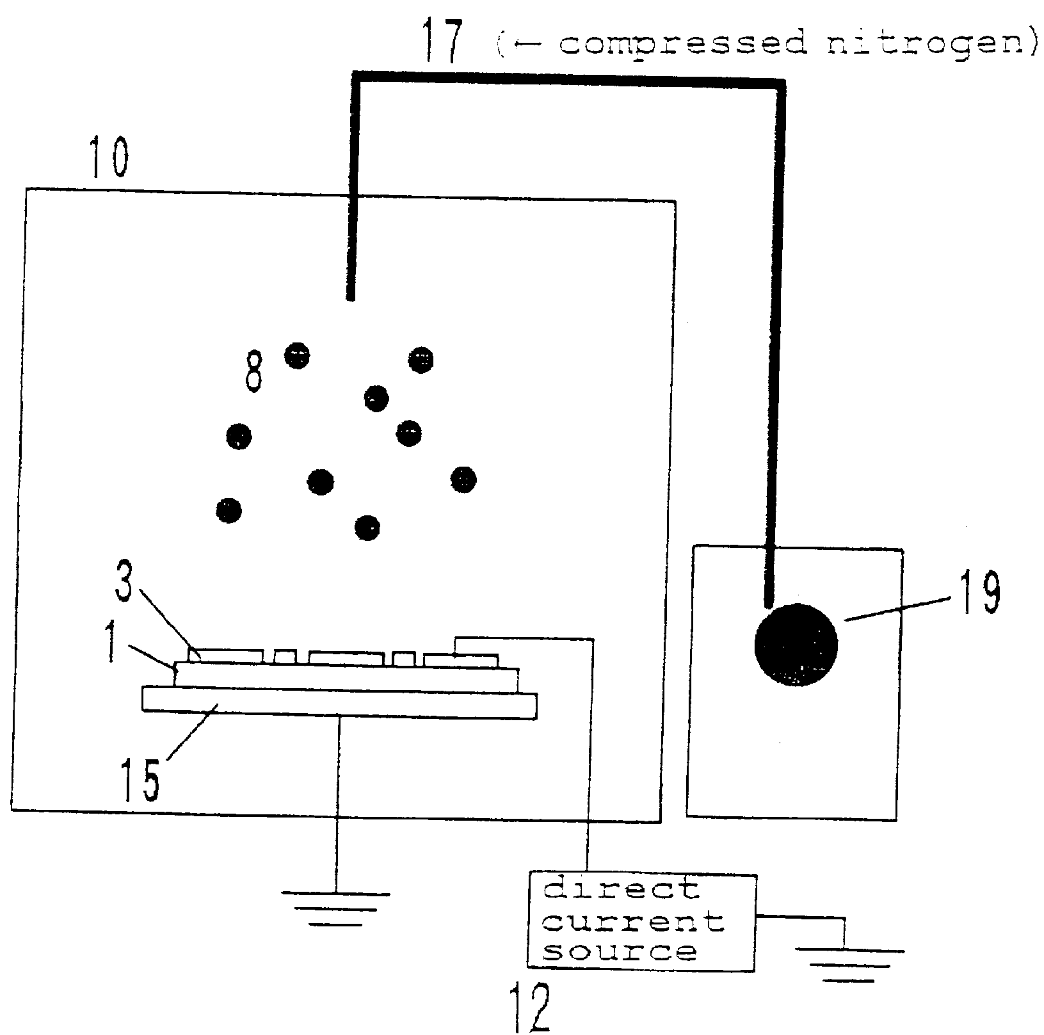
FIG. 34 is a schematic sectional view of a spacer sprayer to be used in the practice of the method for producing a liquid crystal display device according to an aspect of the present invention.

The sprayer used was a Nisshin Engineering dry sprayer, as shown in FIG. 34. The substrate was disposed on an earthed stainless steel conductive stage in close contact with the same. A terminal for voltage application as connected with the voltage application apparatus was provided within the sprayer and a wiring was led into the sprayer so that voltage supply to the substrate might be made.

Micropearl CB (trademark; product of Sekisui Fine Chemical; particle size: 5.7 μm) were prepared as the spacers.

Then, a voltage of +1.8 kV was applied to the transparent electrodes other than the isolated transparent electrodes on the substrate. While maintaining this state, spacers were passed through a pipeline (whereby the spacers were charged positively) and sprayed onto the substrate by means of compressed air. That the spacers are positively charged was confirmed beforehand.

Figure 35:
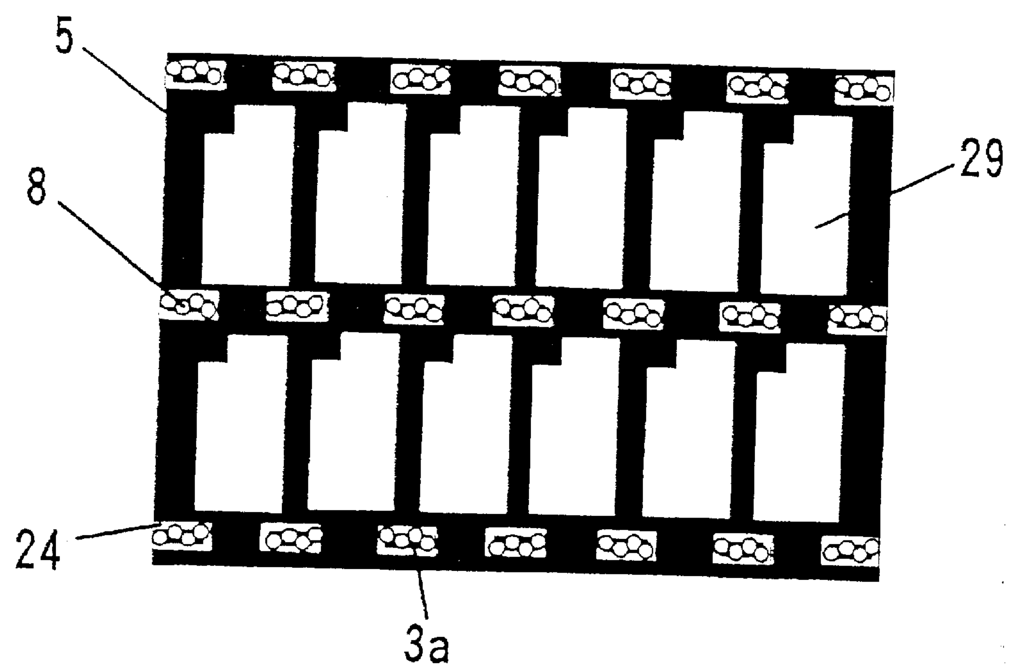
FIG. 35 is a plan view illustrating the state after spacer spraying onto the substrate shown in FIG. 28.
Figure 36:
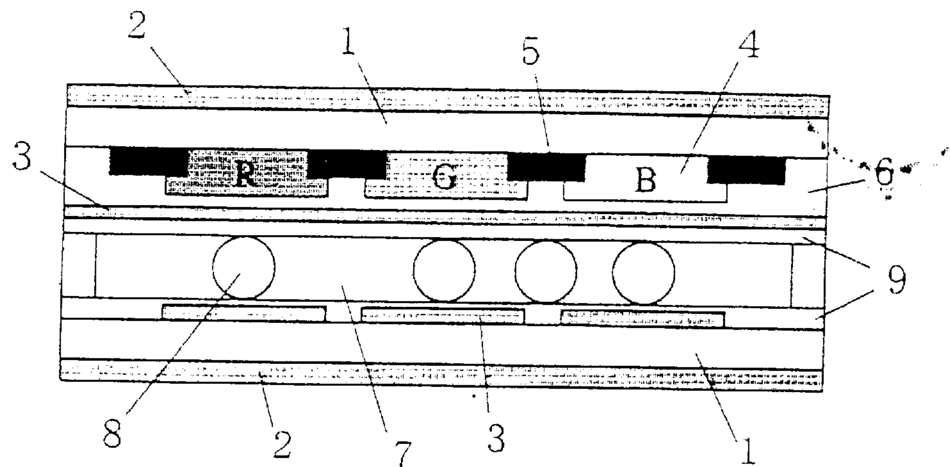
FIG. 36 is a schematic view illustrating the conventional method for producing a liquid crystal display device.
Figure 37:
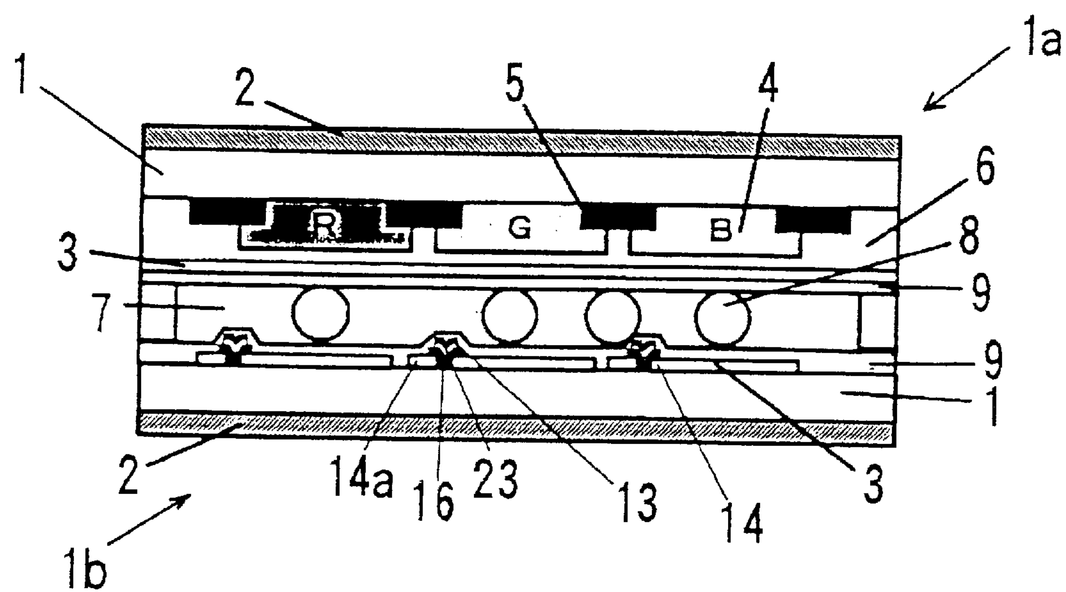
FIG. 37 is a schematic view illustrating the conventional method of TFT-type liquid crystal display device production.

Observation of the first substrate having the spacers disposed thereon under a light microscope revealed that the spacers had been disposed, as shown in FIG. 35, only in those sites where there were the isolated transparent electrodes formed.

Thereafter, the substrate was used to complete a TFT type liquid crystal display device by the conventional process. Upon screen observation, the thus-completed TFT type LCD showed high contrast owing to the absence of spacers in the display area.

The spacers adhered to the alignment layer as a result of pressure application to a sealing material and heating in the curing process, and their translocation or the like was not observed.

EXAMPLE 35

The procedure of Example 34 was followed in the same manner except that an antistatic mat having a resistance value of not more than $10^7$ Ωcm was placed on the stainless steel conductive stage in the spacer sprayer in close contact with the same, and the first substrate was disposed thereon in close contact.

Observation of the first substrate having the spacers disposed thereon under a light microscope revealed that the spacers had been disposed only in those sites where there were the isolated transparent electrodes formed.

EXAMPLE 36

The procedure of Example 34 was followed in the same manner except that a pigment dispersion type black resist was used in lieu of the chromium black matrix and the same pattern as in the case of chromium black matrix was formed and that a voltage of +2.0 kV was applied.

Observation of the first substrate having the spacers disposed thereon under a light microscope revealed that the spacers had been disposed only in those sites where there were the isolated transparent electrodes formed.

Comparative Example 4

The procedure of Example 34 was followed in the same manner except that pins made of a resin comprising a fluoro resin were erected on the stage and the first substrate was disposed thereon to thereby keep the whole first substrate apart from the stage for insulation by means of air.

Observation of the first substrate having the spacers disposed thereon under a light microscope revealed that the spacers had been disposed not only at black matrix sites but also on the transparent electrodes abundantly and almost randomly.

Industrial Applicability

The method for producing a liquid crystal display device according to the present invention, which is as mentioned above, is a method of producing liquid crystal display devices comprising a substrate having pattern-forming transparent electrodes formed thereon and makes it possible to dispose spacers exclusively in electrode-free interelectrode spaces, namely at black matrix sites, to dispose spacers in such a mode all over the display area or to dispose spacers at black matrix sites with high yield and accuracy, and to reduce the tact time by omitting the step of voltage application to the transparent electrodes on the substrate within the spray chamber.

It is therefore possible to produce liquid crystal display devices showing no spacer-due light leakage, showing very high contrast, maintaining a uniform cell thickness and having high quality display performance characteristics without showing display unevenness, in a stable manner with a reduction in tact time.

Even in the case of TFT type liquid crystal display devices, such liquid crystal display devices showing very high contrast without showing spacer-due light leakage can be produced.

The liquid crystal display device according to the invention, which is constituted as mentioned above, shows no spacer-due light leakage, shows very high contrast, has a uniform cell thickness and has high quality display performance characteristics without showing display unevenness.

What is claimed is:

1. A method for producing a liquid crystal display device comprising spraying spacers onto at least one of a first substrate comprising at least pattern-forming transparent electrodes and a second substrate to be disposed opposingly above the first substrate and filling a liquid crystal into the space between both the substrates, wherein, in spraying positively or negatively charged spacers onto the substrate, the substrate is disposed in close contact with an earthed conductive stage having a volume resistance of not more than $10^{10}$ Ωcm to thereby improve the precision of selective spacer positioning in a space of the transparent electrodes, and a voltage of 1.5 kV to 5 kV having the same polarity as the spacer charge polarity is applied to the transparent electrodes, and the spacers are fixed on the substrate surface by heating.

2. The method for producing a liquid crystal display device according to claim 1, wherein the substrate has a dummy electrode and, in applying a voltage to the transparent electrodes, a voltage is applied to the dummy electrode as well to thereby attain a uniform cell gap.

3. The method for producing a liquid crystal display device according to claim 2, wherein the voltage application to the transparent electrodes is effected by connecting the dummy electrode with the transparent electrodes and applying a voltage to the dummy electrode.

4. The method for producing a liquid crystal display device according to claim 2, wherein the voltage applied to the dummy electrode is different from the voltage applied to the transparent electrodes.

5. A method for producing a liquid crystal display device comprising spraying spacers onto at least one of a first substrate comprising at least pattern-forming transparent electrodes, a conductive black matrix and an overcoat layer and a second substrate to be disposed opposingly above the first substrate and filling a liquid crystal into the space between both the substrates, wherein, in spraying positively or negatively charged spacers onto the substrate, a voltage (V1) is applied to the conductive black matrix and a voltage (V2) to the transparent electrodes, both the voltages V1 and V2 being positive ones and satisfying the relation V1<V2 when the spacer charge polarity is positive, or both V1 and V2 being negative voltages and satisfying the relation V1<V2 when the spacer charge polarity is negative, and the potential difference between V1 and V2 is not more than 100V.

6. A method for producing a liquid crystal display device comprising spraying spacers onto at least one of a first substrate comprising at least pattern-forming transparent electrodes, an alignment layer and one or more display areas and a second substrate to be disposed opposingly above the first substrate and filling a liquid crystal into the space between both the substrates, wherein, in spraying positively or negatively charged spacers onto the substrate, the substrate is disposed in close contact with an earthed conductive stage smaller in size than the substrate to thereby allow the peripheral edge portions thereof to be apart from the conductive stage and a voltage of the same polarity as the spacer charge polarity is applied to the transparent electrodes on the substrate to thereby prevent the decrease in the number of spacers disposed on the periphery of the substrate.

7. The method for producing a liquid crystal display device according to claim 6, wherein the substrate onto which spacers are to be sprayed has a black matrix formed thereon, said black matrix being conductive and said conductive stage comprising one or more parts each smaller in size as compared with the picture-frame peripheral edges of the black matrix of each display area on the substrate.

8. The method for producing a liquid crystal display device according to claim 6, wherein the area of contact between the conductive stage and the substrate is not less than 30% of the part of the display area.

9. A method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, and comprising the step of removing moisture from the substrate onto which spacers are to be sprayed, the step of disposing the substrate into close contact with an earthed conductive stage and then spraying spacers while applying a voltage of the same polarity as the spacer charge polarity to the transparent electrodes on the substrate to thereby improve the precision of selective spacer positioning in a space of the transparent electrodes wherein, upon application of a voltage of 1 kV to the transparent electrodes on the substrate after completion of the step of removing moisture, the current flowing between the transparent electrodes on the substrate and the conductive stage is not more than $10^{-6}$ A.

10. The method for producing a liquid crystal display device according to claim 9, wherein the step of removing moisture is carried out by heating the substrate prior to spacer spraying.

11. The method for producing a liquid crystal display device according to claim 10, wherein the heating of the substrate is carried out at a temperature of not lower than 50° C.

12. The method for producing a liquid crystal display device according to claim 9, wherein the step of removing moisture is carried out by heating the substrate during spacer spraying.

13. The method for producing a liquid crystal display device according to claim 9, wherein the step of removing moisture is carried out by blowing a dry gas onto the substrate prior to spacer spraying.

14. The method for producing a liquid crystal display device according to claim 9, wherein the step of removing moisture is carried out by replacing moisture with a solvent prior to spacer spraying.

15. The method for producing a liquid crystal display device according to claim 9, wherein the step of removing moisture is carried out by allowing the substrate to stand under vacuum or by heating the substrate under vacuum prior to spacer spraying.

16. A method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, and comprising the step of disposing the substrate into close contact with an earthed conductive stage and spraying spacers while applying a voltage of the same polarity as the spacer charge polarity to the transparent electrodes on the substrate, the substrate before and during spacer spraying showing characteristics such that, when a voltage of 1 kV is applied to the transparent electrodes on the substrate, the current flowing between the transparent electrodes on the substrate and the conductive stage is not more than $10^{-6}$ A to thereby improve the precision of selective spacer positioning in a space of the transparent electrodes.

17. The method for producing a liquid crystal display device according to claim 16, wherein the step of disposing the substrate into close contact with an earthed conductive stage and spraying spacers while applying a voltage of the same polarity as the spacer charge polarity to the transparent electrodes on the substrate is carried out under conditions controlled so that the temperature is within the room temperature range, namely 18° C. to 28° C. and the relative humidity amounts to not more than 50% RH.

18. The method for producing a liquid crystal display device according to claim 17, wherein the substrate is kept in an environment where the temperature is within the room temperature range, namely 18° C. to 28° C.

and the relative humidity amounts to not more than 50% RH.

19. A method for producing a liquid crystal display device comprising spraying spacers onto at least one of a first substrate comprising at least pattern-forming transparent electrodes and an alignment layer and a second substrate to be disposed opposingly above the first substrate and filling a liquid crystal into the space between both the substrates, wherein, in spraying positively or negatively charged spacers onto the substrate, the substrate is disposed in close contact with an earthed conductive stage, a voltage of the same polarity as the spacer charge polarity is applied to the transparent electrodes on the substrate, then the terminals of the voltage application apparatus are disconnected from the transparent electrodes and spacer spraying is carried out while the electric charge remains on the substrate.

20. The method for producing a liquid crystal display device according to claim 19, wherein the earthed conductive stage is a mobile one and, in spraying positively or negatively charged spacers onto the substrate, the substrate is disposed in close contact with the conductive stage, then a voltage of the same polarity as the spacer charge polarity is applied to the transparent electrodes on the substrate, the terminals of the voltage application apparatus are disconnected from the transparent electrodes, the conductive stage together with the substrate in close contact therewith is transferred to a spacer sprayer, and thereafter, spacer spraying is carried out.

21. A method for producing a liquid crystal display device comprising spraying spacers onto at least one of a first substrate comprising at least pattern-forming transparent electrode and an alignment layer and a second substrate to be disposed opposingly above the first substrate and filling a liquid crystal into the space between both the substrates, wherein, in spraying positively or negatively charged spacers onto the substrate, the substrate is disposed in close contact with an earthed conductive stage, a voltage of the same polarity as the spacer charge polarity is applied to the transparent electrodes on the substrate while maintaining that state of voltage application for a certain period of time, and then spacer spraying is carried out while maintaining that state of voltage application.

22. The method for producing a liquid crystal display device according to claim 21, wherein the voltage application state is maintained at least for 5 minutes prior to carrying out spacer spraying while maintaining that state of voltage application.

23. A method for producing a liquid crystal display device comprising spraying spacers onto a first substrate comprising at least pattern-forming transparent electrodes, a conductive black matrix, an overcoat layer and an alignment layer, and filling a liquid crystal into the space between the first substrate and a second substrate comprising thin film transistors formed thereon which is to be disposed opposingly above the first substrate, wherein the first substrate has transparent electrode-free etched regions formed within the transparent electrodes over and within the expanse of the corresponding conductive black matrix areas, and, in spraying positively or negatively charged spacers onto the first substrate, a voltage (V1) is applied to the conductive black matrix and a voltage (V2) to the transparent electrodes, both the voltages V1 and V2 being positive ones and satisfying the relation V1<V2 when the spacer charge polarity is positive, or both V1 and V2 being negative voltages and satisfying the relation V1>V2 when the spacer charge polarity is negative, and the potential difference between V1 and V2 is not more than 100V.

24. A method for producing a liquid crystal display device comprising spraying spacers onto a first substrate comprising at least pattern-forming transparent electrodes, a black matrix, an overcoat layer and an alignment layer, and filling a liquid crystal into the space between the first substrate and a second substrate comprising thin film transistors formed thereon which is to be disposed opposingly above the first substrate wherein the first substrate has transparent electrode-free etched regions formed within the transparent electrodes over and within the expanse of the corresponding conductive black matrix areas, and, in spraying positively or negatively charged spacers onto the first substrate, the first substrate is disposed in close contact with an earthed conductive stage having a volume resistance of not more than $10^{10}$ Ωcm and a voltage of 200 V to 5 kV having the same polarity as the spacer charge polarity is applied to the transparent electrodes, and the spacers are fixed on the substrate surface by heating.

25. A method for producing a liquid crystal display device comprising spraying spacers onto a first substrate comprising at least pattern-forming transparent electrodes, and filling a liquid crystal into the space between the first substrate and a second substrate comprising thin film transistors formed thereon which is to be disposed opposingly above the first substrate, wherein the first substrate has isolated, electrically floating, transparent electrodes not connected with the surrounding transparent electrodes but formed within the transparent electrodes within the expanse of the corresponding black matrix areas as formed on the first or second substrate, and, in spraying positively or negatively charged spacers onto the first substrate, the first substrate is disposed in close contact with an earthed conductive stage having a volume resistance of not more than $10^{10}$ Ωcm and a voltage of the same polarity as the spacer charge polarity is applied to the transparent electrodes other than the isolated transparent electrodes on the first substrate.

26. The method for producing a liquid crystal display device according to claim 1, 5, 9, 16, 19, 21, 23, 24 or 25.

wherein spacers are charged positively or negatively by being sprayed through a pipeline made of a resin or a metal using a gas as a medium.

27. The method for producing a liquid crystal display device according to claim 5, 6, 9, 16, 19, 21, 23, or 25.

wherein spacers are fixed on the substrate surface by heating.

28. A liquid crystal display device produced by the method for producing a liquid crystal display device according to claim 1, 5, 6, 9, 16, 19, 21, 23, 24 or 25.

* * * * *

UNITED STATES PATENT AND TRADEMARK OFFICE

CERTIFICATE OF CORRECTION

PATENT NO. : 6,639,644 B1
DATED : October 28, 2003
INVENTOR(S) : Tateno et al.

It is certified that error appears in the above-identified patent and that said Letters Patent is hereby corrected as shown below:

Title page,
Item [54], Title, delete “WITH ELECTROSTATIC CONTROL OF SPRAYED SPACER PARTICLE DEPOSITION”.
Item [30], Foreign Application Priority Data, change “Nov. 3, 1998” to -- Mar. 11, 1998 --.

Column 47,
Line 12, change “<“ to -- > --.

Column 50,
Line 53, after “5,” insert -- 6, --.
Line 53, change “.” to -- , --.
Line 58, change “.” to -- , --.

Signed and Sealed this

Eighteenth Day of May, 2004

JON W. DUDAS
*Acting Director of the United States Patent and Trademark Office*